(12) United States Patent
Noda et al.

(10) Patent No.: US 10,954,128 B2
(45) Date of Patent: Mar. 23, 2021

(54) METHOD OF PRODUCING FIBROUS CARBON NANOSTRUCTURES

(71) Applicants: WASEDA UNIVERSITY, Tokyo (JP); ZEON CORPORATION, Tokyo (JP)

(72) Inventors: Suguru Noda, Tokyo (JP); Soichiro Hachiya, Tokyo (JP); Zhongming Chen, Tokyo (JP); Takayoshi Hongo, Tokyo (JP)

(73) Assignees: WASEDA UNIVERSITY, Tokyo (JP); ZEON CORPORATION, Tokyo (JP)

( * ) Notice: Subject to any disclaimer, the term of this patent is extended or adjusted under 35 U.S.C. 154(b) by 108 days.

(21) Appl. No.: 16/078,744

(22) PCT Filed: Jan. 20, 2017

(86) PCT No.: PCT/JP2017/002001
§ 371 (c)(1),
(2) Date: Aug. 22, 2018

(87) PCT Pub. No.: WO2017/145604
PCT Pub. Date: Aug. 31, 2017

(65) Prior Publication Data
US 2019/0055128 A1    Feb. 21, 2019

(30) Foreign Application Priority Data

Feb. 27, 2016   (JP) .............................. JP2016-036478

(51) Int. Cl.
*C01B 32/162* (2017.01)
*B01J 23/745* (2006.01)
(Continued)

(52) U.S. Cl.
CPC ........... *C01B 32/162* (2017.08); *B01J 23/745* (2013.01); *C01B 32/152* (2017.08);
(Continued)

(58) Field of Classification Search
CPC ... C01B 32/162; C01B 32/158; C01B 32/152; C01B 32/16; C01B 32/184;
(Continued)

(56) References Cited

U.S. PATENT DOCUMENTS

2006/0257310 A1* 11/2006 Tada ...................... B82Y 30/00
                                                                              423/447.3
2008/0318049 A1   12/2008 Hata et al.
(Continued)

FOREIGN PATENT DOCUMENTS

CN            103153849 A       6/2013
EP              2383225 A1      11/2011
(Continued)

OTHER PUBLICATIONS

Aug. 28, 2018, International Preliminary Report on Patentability issued in the International Patent Application No. PCT/JP2017/002001.

(Continued)

*Primary Examiner* — Daniel C. McCracken
(74) *Attorney, Agent, or Firm* — Kenja IP Law PC

(57) ABSTRACT

A method of producing fibrous carbon nanostructures uses a fluidized bed process, and comprises supplying a source gas to a reaction site in which a supported catalyst having a particulate carrier and a catalyst supported on a surface of the carrier is fluidizing, to form fibrous carbon nanostructures on the catalyst of the supported catalyst, wherein the source gas contains a double bond-containing hydrocarbon and carbon dioxide, and a content of the carbon dioxide is 0.3 vol % or more with respect to a total volume of the source gas.

7 Claims, 19 Drawing Sheets

(51) Int. Cl.
  *C01B 32/158* (2017.01)
  *C01B 32/152* (2017.01)
  *D01F 9/127* (2006.01)
  *C01B 32/16* (2017.01)
  *B82Y 40/00* (2011.01)
  *B82Y 30/00* (2011.01)

(52) U.S. Cl.
  CPC ............ *C01B 32/158* (2017.08); *C01B 32/16* (2017.08); *D01F 9/1273* (2013.01); *B82Y 30/00* (2013.01); *B82Y 40/00* (2013.01)

(58) Field of Classification Search
  CPC ... C01B 32/159; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; D01F 9/1273; B01J 23/745; B01J 35/1009; B82Y 30/00; B82Y 40/00
  See application file for complete search history.

(56) References Cited

U.S. PATENT DOCUMENTS

| | | |
|---|---|---|
| 2009/0099016 A1 | 4/2009 | Carruthers et al. |
| 2011/0008617 A1 | 1/2011 | Hata et al. |
| 2011/0117365 A1 | 5/2011 | Hata et al. |
| 2013/0287674 A1 | 10/2013 | Haba et al. |
| 2015/0246813 A1 | 9/2015 | Koveal, Jr. et al. |
| 2016/0348282 A1* | 12/2016 | Kaneko .................... B01J 21/10 |

FOREIGN PATENT DOCUMENTS

| | | | |
|---|---|---|---|
| JP | 2009528238 A | 8/2009 | |
| JP | 2014185077 A | 10/2014 | |
| JP | 2015038038 A | 2/2015 | |
| JP | 2015078120 A | 4/2015 | |
| JP | 2015533762 A | 11/2015 | |
| WO | 2012057229 A1 | 5/2012 | |
| WO | WO 2015/119102 | * 8/2015 | ............. C01B 31/12 |

OTHER PUBLICATIONS

Riichiro Saito et al., Basics and Applications of Carbon Nanotubes, Mar. 31, 2004, p. 33, I. 27-p. 34, I. 29, Baifukan.

Sumio Iijima, Helical microtubules of graphitic carbon, Nature, Nov. 7, 1991, pp. 56-58, vol. 354.

Jul. 24, 2019, The Extended European Search Report issued by the European Patent Office in the corresponding European Patent Application No. 17756046.3.

* cited by examiner

CO$_2$ CONCENTRATION: 0 VOL%
C$_2$H$_4$ CONCENTRATION: 20.0 VOL%
SUPPORTED CATALYST SUPPLY AMOUNT: 10g (i)

(ii)

(iii)

CO$_2$ CONCENTRATION: 0.3 VOL%
C$_2$H$_4$ CONCENTRATION: 20.0 VOL%
SUPPORTED CATALYST SUPPLY AMOUNT: 10g (i)

(ii)

(iii)

CO$_2$ CONCENTRATION: 1.0 VOL%
C$_2$H$_4$ CONCENTRATION: 20.0 VOL%
SUPPORTED CATALYST SUPPLY AMOUNT: 10g (i)

(ii)

(iii)

CO$_2$ CONCENTRATION: 3.0 VOL%
C$_2$H$_4$ CONCENTRATION: 20.0 VOL%
SUPPORTED CATALYST SUPPLY AMOUNT: 10g (i)

(ii)

(iii)

CO$_2$ CONCENTRATION: 10.0 VOL%
C$_2$H$_4$ CONCENTRATION: 20.0 VOL%
SUPPORTED CATALYST SUPPLY AMOUNT: 10g (i)

(ii)

(iii)

CO₂ CONCENTRATION: 1.0 VOL%
C₂H₄ CONCENTRATION: 20.0 VOL%
SUPPORTED CATALYST SUPPLY AMOUNT: 30g (i)

(ii)

(iii)

$CO_2$ CONCENTRATION:3.0 VOL%
$C_2H_4$ CONCENTRATION:10.0 VOL%
SUPPORTED CATALYST SUPPLY AMOUNT:10g (i)

(ii)

(iii)

CO$_2$ CONCENTRATION:3.0 VOL%
C$_2$H$_4$ CONCENTRATION:20.0 VOL%
SUPPORTED CATALYST SUPPLY AMOUNT:10g (i)

(ii)

(iii)

$CO_2$ CONCENTRATION: 3.0 VOL%
$C_2H_4$ CONCENTRATION: 30.0 VOL%
SUPPORTED CATALYST SUPPLY AMOUNT: 10g (i)

(ii)

(iii)

$CO_2$ CONCENTRATION: 3.0 VOL%
$C_2H_4$ CONCENTRATION: 10.0 VOL%
VAPOR-DEPOSITED SUPPORTED CATALYST SUPPLY AMOUNT: 54g
(i)
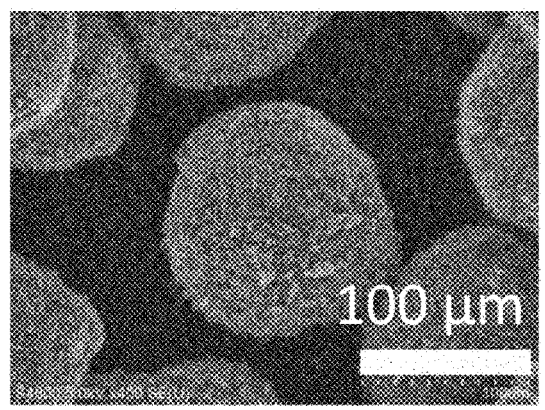
*FIG. 5A*
(ii)
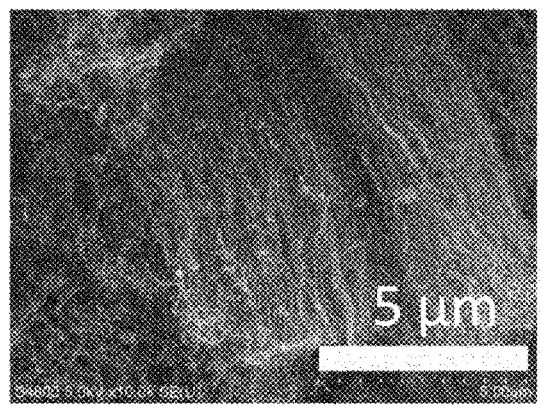
(iii)
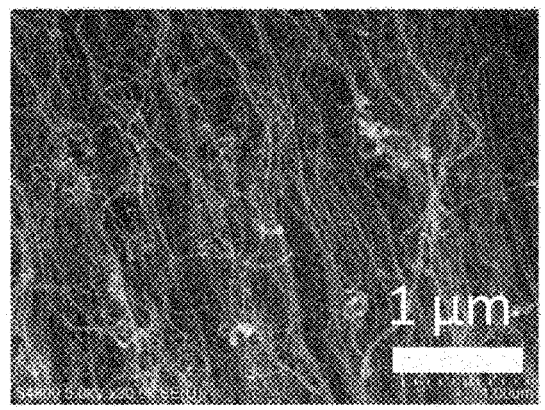

$CO_2$ CONCENTRATION: 3.0 VOL%
$C_2H_4$ CONCENTRATION: 10.0 VOL%
VAPOR-DEPOSITED SUPPORTED CATALYST SUPPLY AMOUNT: 27g (i)

(ii)

$CO_2$ CONCENTRATION: 3.0 VOL%
$C_2H_4$ CONCENTRATION: 10.0 VOL%
VAPOR-DEPOSITED SUPPORTED CATALYST SUPPLY AMOUNT: 54g (i)

(ii)

CO$_2$ CONCENTRATION:3.0 VOL%
C$_2$H$_4$ CONCENTRATION:10.0 VOL%
VAPOR-DEPOSITED SUPPORTED CATALYST SUPPLY AMOUNT:81g (i)

(ii)

CO₂ CONCENTRATION:
0~10.0 VOL%
C₂H₄ CONCENTRATION:
20.0 VOL%
SUPPORTED CATALYST
SUPPLY AMOUNT: 10g

CO₂ CONCENTRATION: 1.0 VOL%
C₂H₄ CONCENTRATION: 20.0 VOL%
SUPPORTED CATALYST SUPPLY AMOUNT: 30g $CO_2$ CONCENTRATION: 3.0 VOL%
$C_2H_4$ CONCENTRATION: 10.0 VOL%
VAPOR-DEPOSITED SUPPORTED CATALYST SUPPLY AMOUNT: 27~81g

METHOD OF PRODUCING FIBROUS CARBON NANOSTRUCTURES

TECHNICAL FIELD

The present disclosure relates to a method of producing fibrous carbon nanostructures. The present disclosure more specifically relates to a method of producing fibrous carbon nanostructures using a fluidized bed process of causing a catalyst to fluidize.

BACKGROUND

Fibrous carbon nanostructures such as carbon nanotubes (hereafter also referred to as "CNTs"; for example, see S. Iijima, Nature 354, 56 (1991) (NPL 1)) are excellent in various characteristics such as mechanical strength, sliding characteristics, flexibility, semiconductor and metallic conductivity, and thermal conductivity and also have high chemical stability, and therefore have been increasingly used in a wide variety of applications.

Methods of producing such fibrous carbon nanostructures having excellent characteristics efficiently at low cost have thus been studied in recent years.

Carbon nanotube production methods which have been reported include an arc discharge method, a laser vaporization method, and a chemical vapor deposition method (CVD method). In particular, CVD is a production method greatly studied as a method suitable for large-scale synthesis, continuous synthesis, and high-purity synthesis of single-walled carbon nanotubes excellent in the above-mentioned characteristics (for example, see Riichiro Saito and Hisanori Shinohara, Basics and Applications of Carbon Nanotubes, BAIFUKAN, 2004 (NPL 2)).

For example, WO 2012/057229 A1 (PTL 1) discloses a technique of causing, on a support substrate surface supporting a catalyst composed of Fe and Al, source gas composed of acetylene, carbon dioxide, and inactive gas to flow at a predetermined partial pressure, thus synthesizing carbon nanotubes on the support. Specifically, according to PTL 1, single-walled carbon nanotubes with a length of 1.0 mm or more are obtained by adjusting the partial pressure ratio of acetylene/carbon dioxide to 0.7 or less within a range in which the partial pressure of acetylene is 1.2 Torr to 20 Torr and the partial pressure of carbon dioxide is 7.6 Torr to 30.4 Torr in the source gas at normal pressure.

CITATION LIST

Patent Literatures

PTL 1: WO 2012/057229 A1

Non-Patent Literatures

NPL 1: S. Iijima, Nature 354, 56 (1991)
NPL 2: Riichiro Saito and Hisanori Shinohara, Basics and Applications of Carbon Nanotubes, BAIFUKAN, 2004

SUMMARY

Technical Problem

Since acetylene used in the conventional carbon nanotube production method described in PTL 1 as an example has high reaction activity as carbon material, the method described in PTL 1 has a problem in that the carbonization deactivation of the catalyst is promoted in the case where acetylene is supplied in high concentration. Hence, with the method described in PTL 1, acetylene as carbon material needs to be supplied in low concentration, which leaves room for improvement in carbon nanotube productivity.

The method described in PTL 1 also has a problem in that, due to the low concentration of carbon material mentioned above, carrier gas needs to be supplied in high concentration with respect to the concentration of carbon material. Thus, with the method described in PTL 1, there is a need to reduce an increase in cost resulting from the use of a large amount of carrier gas components not contributing to the synthesis reaction of carbon nanotubes.

It could therefore be helpful to provide a method of producing fibrous carbon nanostructures that is capable of highly efficient synthesis and growth of fibrous carbon nanostructures such as carbon nanotubes at lower cost.

Solution to Problem

The inventors conducted extensive studies to achieve the object stated above, and discovered that, by containing a carbon component lower in activity than acetylene and a predetermined content of a predetermined additive component in source gas supplied to a reaction site in a fluidized bed process, fibrous carbon nanostructures can be produced with high yield even when carbon material is used in high concentration. The inventors also discovered that, with such supply of the carbon material in high concentration, the content of gas components not contributing to the synthesis reaction of fibrous carbon nanostructures with respect to the carbon material can be reduced, with it being possible to significantly reduce the synthesis cost of fibrous carbon nanostructures.

To advantageously solve the problems stated above, a presently disclosed method of producing fibrous carbon nanostructures is a method of producing fibrous carbon nanostructures using a fluidized bed process, the method comprising supplying a source gas to a reaction site in which a supported catalyst having a particulate carrier and a catalyst supported on a surface of the carrier is fluidizing, to form fibrous carbon nanostructures on the catalyst of the supported catalyst, wherein the source gas contains a double bond-containing hydrocarbon and carbon dioxide, and a content of the carbon dioxide is 0.3 vol % or more with respect to a total volume of the source gas. Thus, by using the source gas obtained by adding the predetermined content or more of carbon dioxide to the double bond-containing hydrocarbon as carbon material, fibrous carbon nanostructures can be produced with high efficiency. Moreover, the production cost of fibrous carbon nanostructures can be reduced.

As used herein, the term "particulate" denotes that the aspect ratio (major axis/minor axis) of the carrier or supported catalyst measured according to the below-mentioned measurement method is 1 or more and 5 or less. The aspect ratio is preferably 2 or less.

Hereafter, the content of each component in the source gas is also referred to as "concentration".

Preferably, in the presently disclosed method of producing fibrous carbon nanostructures, a content of the double bond-containing hydrocarbon is 4 vol % or more with respect to the total volume of the source gas. By not only setting the content of the carbon dioxide in the source gas to the above-mentioned predetermined content or more but also setting the content of the double bond-containing hydrocarbon as carbon material in the source gas to the predetermined high concentration or more, fibrous carbon nanostructures can be produced more efficiently. Moreover, the production cost of fibrous carbon nanostructures can be further reduced.

Preferably, in the presently disclosed method of producing fibrous carbon nanostructures, the source gas further contains a carrier gas, and a volumetric content of the carrier gas (carrier gas/double bond-containing hydrocarbon) is not more than 10 times a volumetric content of the double bond-containing hydrocarbon. By keeping the supply amount of the carrier gas not involved in the synthesis reaction of fibrous carbon nanostructures low relative to the supply amount of the double bond-containing hydrocarbon, the production cost of fibrous carbon nanostructures can be further reduced.

Preferably, in the presently disclosed method of producing fibrous carbon nanostructures, the double bond-containing hydrocarbon is ethylene. By using ethylene having moderate reaction activity as the double bond-containing hydrocarbon as carbon material, fibrous carbon nanostructures can be produced more efficiently. Moreover, the production cost of fibrous carbon nanostructures can be further reduced.

In the case where the double bond-containing hydrocarbon is ethylene, the ethylene may be pure ethylene containing only ethylene, or may mainly contain ethylene and further contain, for example, any other hydrocarbon.

Preferably, in the presently disclosed method of producing fibrous carbon nanostructures, a specific surface area of the carrier is 1 m$^2$/g or less. By using the carrier having a relatively small specific surface area of 1 m$^2$/g or less in the presently disclosed method of producing fibrous carbon nanostructures, fibrous carbon nanostructures with favorable characteristics can be produced more efficiently.

As used herein, the "specific surface area" can be measured in accordance with JIS Z 8830: 2013.

Advantageous Effect

It is therefore possible to provide a method of producing fibrous carbon nanostructures that is capable of highly efficient synthesis and growth of fibrous carbon nanostructures such as carbon nanotubes at lower cost.

BRIEF DESCRIPTION OF THE DRAWINGS

In the accompanying drawings:

FIG. 5A is a scanning electron microscope (SEM) image of carbon nanotubes synthesized on a supported catalyst according to Example 12;

DETAILED DESCRIPTION

Figure 1:
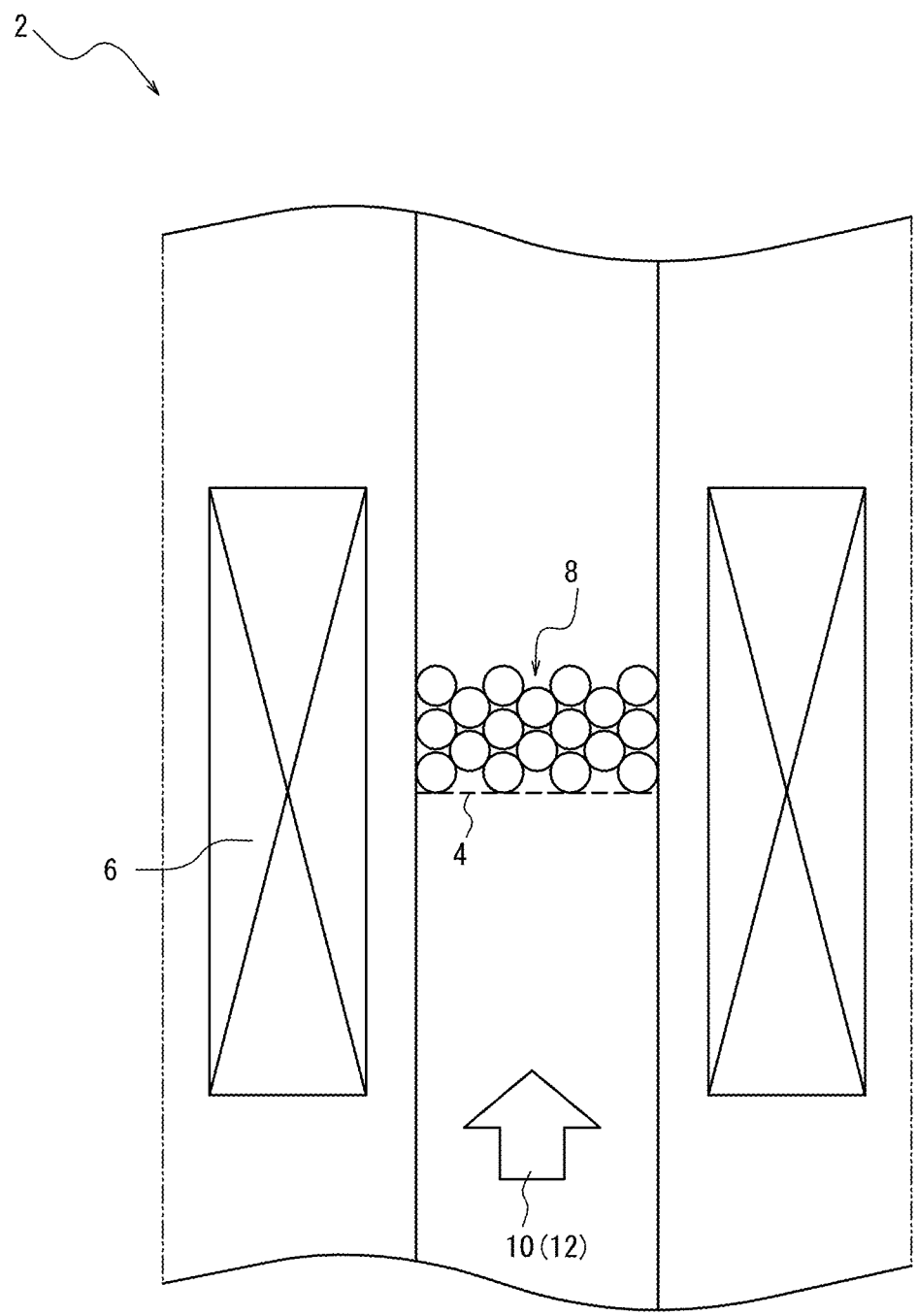
FIG. 1 is a schematic diagram of a reaction tube used in catalyst activation and carbon nanotube synthesis according to examples and comparative examples.
Figure 2A:
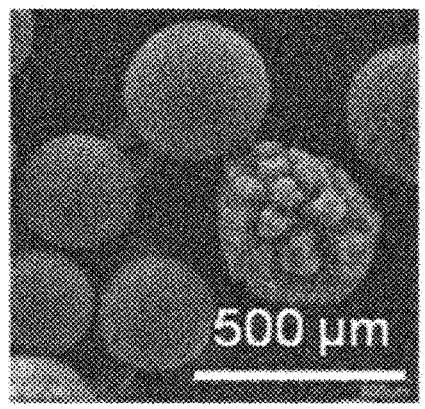
FIG. 2A is a scanning electron microscope (SEM) image of carbon nanotubes synthesized on a supported catalyst according to Comparative Example 1 (for the magnification of each of (i) to (iii), see the scale bar in the image; the same applies hereafter)
Figure 2A:
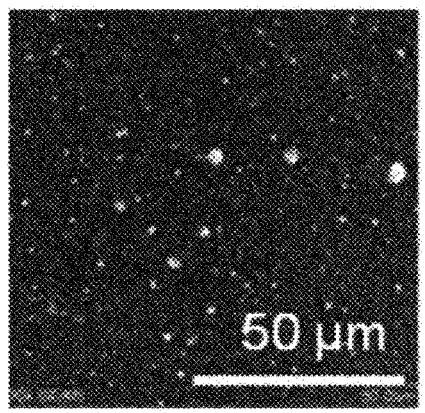
Figure 2A:
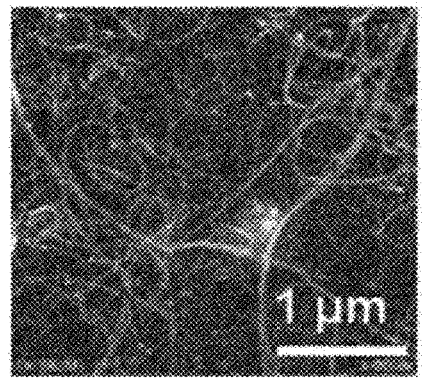
Figure 2B:
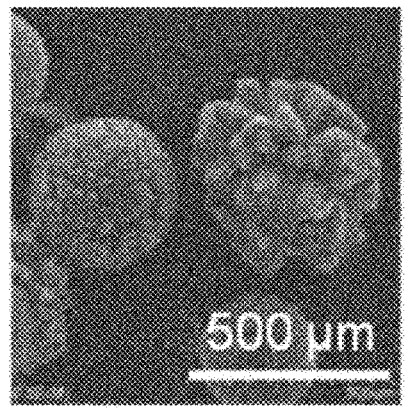
FIG. 2B is a scanning electron microscope (SEM) image of carbon nanotubes synthesized on a supported catalyst according to Example 1.
Figure 2B:
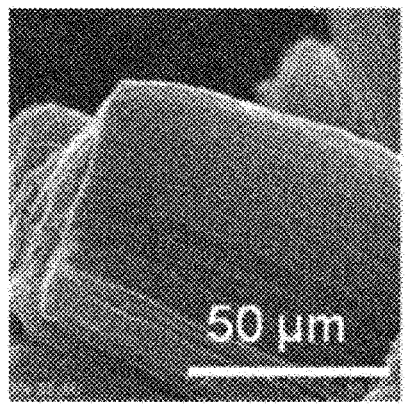
Figure 2B:
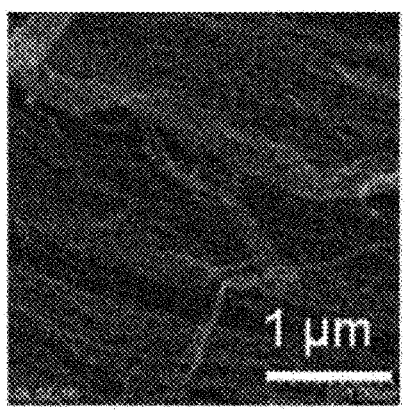
Figure 2C:
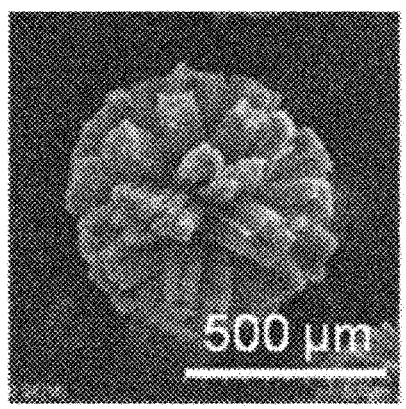
FIG. 2C is a scanning electron microscope (SEM) image of carbon nanotubes synthesized on a supported catalyst according to Example 2.
Figure 2C:
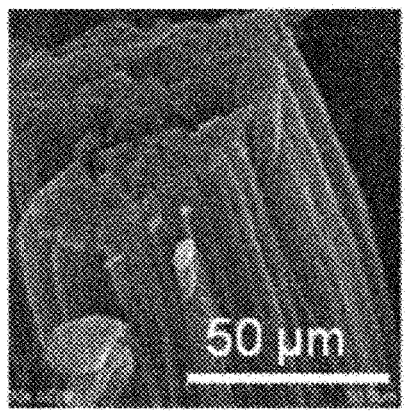
Figure 2C:
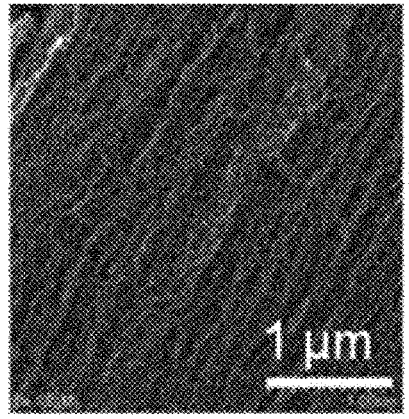
Figure 2D:
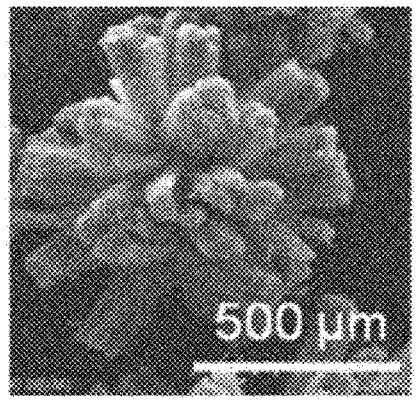
FIG. 2D is a scanning electron microscope (SEM) image of carbon nanotubes synthesized on a supported catalyst according to Example 3.
Figure 2D:
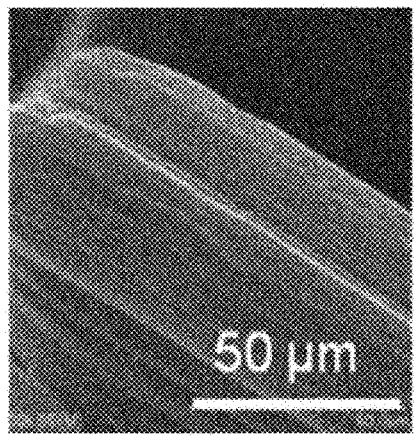
Figure 2D:
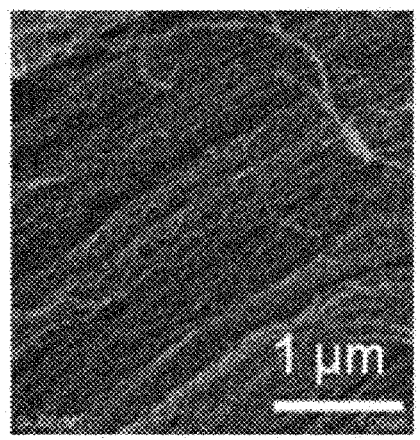
Figure 2E:
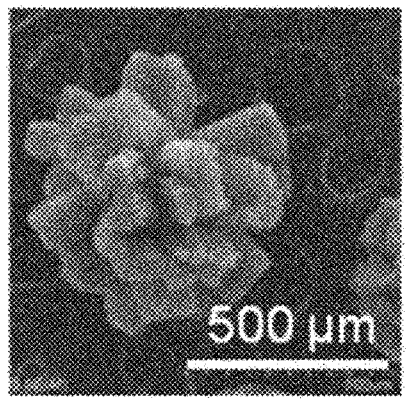
FIG. 2E is a scanning electron microscope (SEM) image of carbon nanotubes synthesized on a supported catalyst according to Example 4.
Figure 2E:
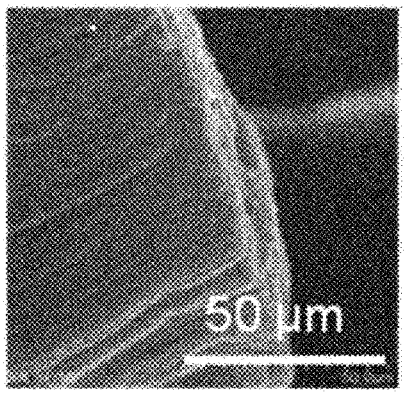
Figure 2E:
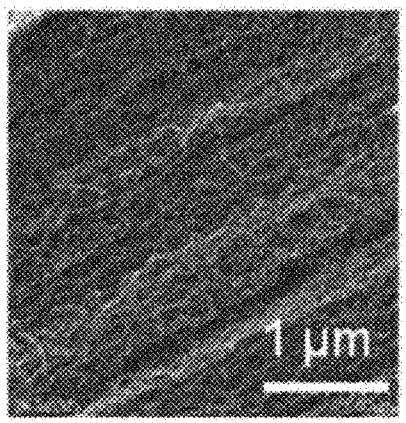
Figure 3:
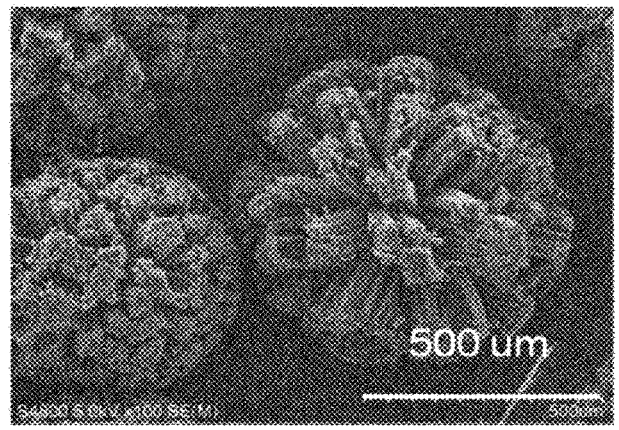
FIG. 3 is a scanning electron microscope (SEM) image of carbon nanotubes synthesized on a supported catalyst according to Example 6.
Figure 3:
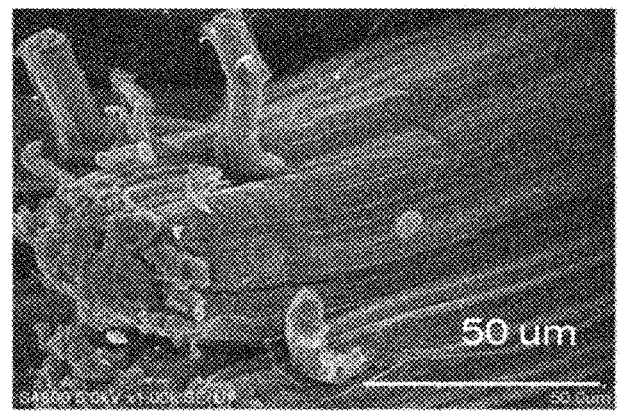
Figure 3:
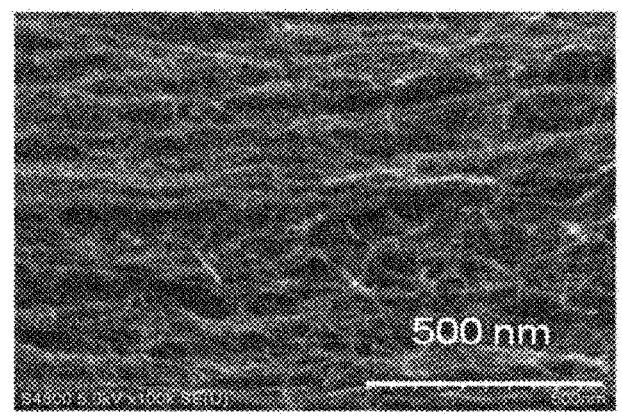

One of the disclosed embodiments is described in detail below.

A presently disclosed method of producing fibrous carbon nanostructures may be used, for example, to produce fibrous carbon nanostructures of fine size such as carbon nanotubes. With the presently disclosed production method, fibrous carbon nanostructures can be produced efficiently with high yield, and the production cost of fibrous carbon nanostructures can be reduced.

(Method of Producing Fibrous Carbon Nanostructures)

The presently disclosed method of producing fibrous carbon nanostructures uses a fluidized bed process, and includes supplying source gas to a reaction site in which a supported catalyst having a particulate carrier and a catalyst supported on a surface of the carrier is caused to fluidize, to form fibrous carbon nanostructures on the catalyst of the supported catalyst. The source gas used in the presently disclosed method of producing fibrous carbon nanostructures contains at least two predetermined types of components (double bond-containing hydrocarbon and carbon dioxide), and the supply amount of one component (carbon dioxide) of the two types of components is a predetermined content or more.

With the presently disclosed method of producing fibrous carbon nanostructures using the fluidized bed process, the source gas contains a double bond-containing hydrocarbon and a predetermined content or more of carbon dioxide, so that fibrous carbon nanostructures such as carbon nanotubes can be produced with high efficiency. In addition, with the presently disclosed method of producing fibrous carbon nanostructures, the predetermined component (carbon dioxide) is added in a relatively large amount, i.e. a predetermined amount or more, so that fibrous carbon nanostructures such as carbon nanotubes can be produced at low cost.

<Source Gas>

The source gas used in the presently disclosed method of producing fibrous carbon nanostructures contains a double bond-containing hydrocarbon and a predetermined content or more of carbon dioxide. The source gas may further contain other carbon materials and other gas components besides the double bond-containing hydrocarbon and the carbon dioxide.

<<Carbon Dioxide>>

The source gas used in the presently disclosed method of producing fibrous carbon nanostructures contains a predetermined content or more of carbon dioxide. Carbon dioxide is contained in the source gas for synthesizing fibrous carbon nanostructures such as carbon nanotubes, as an additive component. Carbon dioxide is an additive component that, in the synthesis of fibrous carbon nanostructures, suppresses the carbonization deactivation of the catalyst and thus allows the below-mentioned double bond-containing hydrocarbon as carbon material to be supplied in high concentration. Therefore, adding a predetermined amount or more of carbon dioxide to the source gas can cause a large amount of carbon source for forming fibrous carbon nanostructures to flow in the reaction site. This enables efficient synthesis of fibrous carbon nanostructures such as carbon nanotubes.

[Content]

The content of the carbon dioxide needs to be 0.3 vol % or more with respect to the total volume of the source gas. The content of the carbon dioxide is preferably 0.5 vol % or more and more preferably 0.9 vol % or more and is preferably 40 vol % or less, more preferably 25 vol % or less, and further preferably 5 vol % or less, with respect to the total volume of the source gas. If the content of the carbon dioxide is not less than the above-mentioned lower limit, the carbonization deactivation of the catalyst is favorably suppressed, and the double bond-containing hydrocarbon as carbon material can be supplied in sufficiently high concentration. If the percentage content of the carbon dioxide is not more than the above-mentioned upper limit, the double bond-containing hydrocarbon as carbon material can be supplied in sufficiently high concentration without excessively adding carbon dioxide. Consequently, fibrous carbon nanostructures such as carbon nanotubes can be produced with high yield. Supplying the double bond-containing hydrocarbon as carbon material in sufficiently high concentration leads to sufficient reduction in the supply concentration of gas components not contributing to the synthesis reaction of fibrous carbon nanostructures, as described later. Hence, the production cost of fibrous carbon nanostructures can be reduced significantly.

In the case where the supply concentration of gas components not contributing to the synthesis reaction of fibrous carbon nanostructures is sufficiently reduced, the total flow rate of the source gas to the reaction site is reduced. This makes it easy to maintain the reaction site at high temperature. A method of producing fibrous carbon nanostructures suitable for scale-up and large-scale synthesis of fibrous carbon nanostructures can thus be provided.

Supplying carbon dioxide in relatively high concentration of the order of percent as mentioned above is also desirable in terms of ease of production and scale-up, because minute amount control is unnecessary as compared with, for example, the case of supplying carbon dioxide in relatively low concentration of the order of ppm.

Although it is not clear why the carbonization deactivation of the catalyst can be favorably suppressed by adding the predetermined content or more of carbon dioxide to the source gas, the reason is presumed to be as follows.

Fibrous carbon nanostructures are formed by decomposing carbon material on a catalyst, incorporating the decomposed carbon into the catalyst, and precipitating from the catalyst, carbon exceeding saturation concentration in the catalyst. When the degree to which the saturation concentration is exceeded, i.e. the degree of supersaturation, is higher, fibrous carbon nanostructures grow faster. Meanwhile, when the degree of supersaturation is higher, the possibility that a carbon coating is formed on the catalyst surface and the catalyst undergoes carbonization deactivation is higher. It is known that carbon dioxide reacts with carbon to form carbon monoxide, as expressed by $CO_2 + C \rightarrow 2CO$ (this chemical reaction is a reversible reaction). Accordingly, supplying carbon dioxide to the reaction site removes the carbon coating on the catalyst surface, as a result of which the catalyst activity is maintained favorably.

<<Double Bond-Containing Hydrocarbon>>

The source gas used in the presently disclosed method of producing fibrous carbon nanostructures contains a double bond-containing hydrocarbon. The double bond-containing hydrocarbon serves as carbon material (carbon source) for synthesizing fibrous carbon nanostructures such as carbon nanotubes.

The source gas may contain other carbon materials besides the double bond-containing hydrocarbon to an extent that does not impair the desired effects disclosed herein.

[Content]

Although not particularly limited, the content of the double bond-containing hydrocarbon contained in the source gas is preferably 4 vol % or more, more preferably 8 vol % or more, further preferably 10 vol % or more, and still further preferably 16 vol % or more, with respect to the total volume of the source gas. If the content of the double bond-containing hydrocarbon is not less than the above-mentioned lower limit, the carbon material can be supplied in high concentration, and the whole or most of the reaction site can be utilized for synthesis reaction, so that fibrous carbon nanostructures such as carbon nanotubes can be synthesized more efficiently. Since the double bond-containing hydrocarbon has low activity as compared with, for example, a triple bond-containing hydrocarbon, the carbonization deactivation of the catalyst can be suppressed even when the double bond-containing hydrocarbon is supplied in high concentration. Thus, the double bond-containing hydrocarbon can be supplied in higher concentration and retained longer in the reaction site than a triple bond-containing hydrocarbon such as acetylene, and so contributes to higher production efficiency of fibrous carbon nanostructures. Moreover, supplying the double bond-containing hydrocarbon as carbon material in high concentration contributes to considerably lower production cost, because a double bond-containing hydrocarbon is typically lower in cost than a triple bond-containing hydrocarbon having the same carbon number and the supply concentration of other gas components not contributing to the synthesis reaction of fibrous carbon nanostructures can be kept low.

In terms of favorably suppressing the carbonization deactivation of the catalyst, the content of the double bond-containing hydrocarbon contained in the source gas may be, for example, 60 vol % or less with respect to the total volume of the source gas, although not limited thereto.

[Type]

The double bond-containing hydrocarbon is not particularly limited, and examples include ethylene, propylene, butene and an isomer thereof, butadiene, pentene and an isomer thereof, and pentadiene. Of these, a double bond-containing hydrocarbon having one double bond in a molecule is preferable, a double bond-containing hydrocarbon having a carbon number of 3 or less is more preferable, and ethylene is further preferable, in terms of having high activity sufficient for the synthesis and growth of fibrous carbon nanostructures and having moderate reaction activity with which catalyst deactivation can be suppressed.

Examples of the ethylene include: pure ethylene composed only of ethylene; and low-purity ethylene containing ethylene and any other hydrocarbon. In terms of reducing the production cost, the use of low-purity ethylene is advantageous. The other hydrocarbon(s) that can coexist with ethylene is not particularly limited, and examples include: alkanes such as methane, ethane, and propane; and alkenes such as propylene.

<<Other Carbon Material>>

Other carbon material besides the double bond-containing hydrocarbon is not particularly limited, and examples include: alkanes such as methane, ethane, propane, and butane; and alkynes such as acetylene, propyne, and butyne. Accordingly, the above-mentioned other hydrocarbon(s) that can coexist with ethylene in the low-purity ethylene may be contained in the source gas as other carbon material besides the double bond-containing hydrocarbon.

In the case of using an alkane as other carbon material together with the double bond-containing hydrocarbon, the content of the alkane may be approximately equal to the content of the double bond-containing hydrocarbon. In the case of using an alkyne as other carbon material together with the double bond-containing hydrocarbon, the content of the alkyne is preferably 3 vol % or less, more preferably 0.3 vol % or less, and further preferably nearly 0 vol % (i.e. no other carbon material is substantially contained), with respect to the total volume of the source gas. If the content of the other carbon material is not more than the above-mentioned upper limit, effects such as supplying the carbon material contributed by the double bond-containing hydrocarbon in high concentration and suppressing the carbonization deactivation of the catalyst can be sufficiently achieved.

<<Other Gas Components>>

Other gas components that may be contained in the source gas besides the above-mentioned double bond-containing hydrocarbon and carbon dioxide include, for example, carrier gas that serves to supply the source gas to the reaction site and flow and fluidize the source gas and the catalyst in the reaction site.

[Carrier Gas]

The carrier gas is not particularly limited, and examples include: inactive gases such as nitrogen gas ($N_2$) and argon gas (Ar); and hydrogen gas ($H_2$). Hydrogen gas is capable of a catalyst reduction action and a tar formation inhibiting action. Hydrogen gas may be a by-product of decomposition of carbon material.

[[Content]]

The volumetric content of the carrier gas that may be contained in the source gas is preferably not more than 10 times, more preferably not more than 7 times, and further preferably not more than 5 times and is typically not less than 1 time the volumetric content of the double bond-containing hydrocarbon. The carrier gas may be omitted. If the volumetric content of the carrier gas with respect to the volumetric content of the double bond-containing hydrocarbon (carrier gas/double bond-containing hydrocarbon) is not more than the above-mentioned upper limit, the supply amount of gas components not contributing to the synthesis reaction of fibrous carbon nanostructures can be significantly reduced to increase the supply amount of the carbon material. This enables more efficient production of fibrous carbon nanostructures such as carbon nanotubes. Moreover, by significantly reducing the supply amount of gas components not contributing to the synthesis reaction of fibrous carbon nanostructures, the production cost of fibrous carbon nanostructures can be further reduced. Furthermore, by keeping the total flow rate of the material supply low, a production method that can easily maintain the reaction site at high temperature and is suitable for scale-up can be provided.

In the case where no carrier gas is contained in the source gas, the double bond-containing hydrocarbon and/or the carbon dioxide can function as carrier gas.

The content ratio of the double bond-containing hydrocarbon and the carbon dioxide (the volumetric content of the double bond-containing hydrocarbon/the volumetric content of the carbon dioxide) in the source gas is preferably 3 times or more, more preferably 5 times or more, further preferably 7 times or more, and still further preferably 15 times or more, and is preferably 70 times or less and may be 50 times or less. If the content ratio of the double bond-containing hydrocarbon and the carbon dioxide is not less than the above-mentioned lower limit, the carbon material for forming fibrous carbon nanostructures can be supplied in higher concentration, so that higher efficiency and lower cost of the production of fibrous carbon nanostructures can both be achieved. If the content ratio of the double bond-containing hydrocarbon and the carbon dioxide is not more than the above-mentioned upper limit, the carbonization deactivation of the catalyst can be sufficiently suppressed owing to the carbon dioxide, so that higher efficiency of the production of fibrous carbon nanostructures can be achieved.

<<Total Flow Rate F and Flow Velocity v>>

The total flow rate F at which the source gas is supplied to the reaction site is not particularly limited, and depends on the product of the flow velocity v of supplying the source gas to the reaction site and the reaction tube cross-sectional area S. The flow velocity v is not particularly limited. For example, in the case where the supported catalyst used has a particle diameter of about 100 μm to 500 μm, the flow velocity v may be 0.03 m/s or more and 3 m/s or less. Here, a low flow velocity of 3 m/s or less can be set because the double bond-containing hydrocarbon having relatively low activity is used as carbon material. By limiting the flow velocity of the source gas to a low level of 3 m/s or less, the reaction temperature of the reaction site can be maintained easily, as mentioned above. A production method more suitable for large-scale synthesis can thus be provided. Furthermore, by limiting the flow velocity of the source gas to a low level of 3 m/s or less, the risk that the fluidizing catalyst is blown out of the reaction tube can be reduced. Accordingly, a catalyst of a relatively small size can be used as the below-mentioned catalyst.

<<Retention Time>>

The retention time in which the source gas is retained in the reaction site is not particularly limited. For example, in the case where the reaction container used has a length of about 0.3 m to 5 m, the retention time may be 0.5 sec or more and 50 sec or less. Here, a long retention time of, for example, up to 50 sec can be set because, by adding the carbon dioxide in high concentration to the source gas, the double bond-containing hydrocarbon as carbon material can be supplied in high concentration, too. Such carbon material in high concentration is brought into contact with the supported catalyst for a sufficient time, as a result of which fibrous carbon nanostructures can be synthesized more efficiently.

<Supported Catalyst>

The supported catalyst used in the presently disclosed method of producing fibrous carbon nanostructures has a particulate carrier and a catalyst supported on a surface of the carrier.

The supported catalyst has functions such as mediating, facilitating, and enhancing efficiency of the synthesis and growth of fibrous carbon nanostructures in the reaction site. The supported catalyst serves to incorporate the carbon material such as the double bond-containing hydrocarbon from the supplied source gas and produce fibrous carbon nanostructures such as carbon nanotubes at the surface, without being particularly limited thereto. More specifically, for example, in the case where the catalyst has a fine particulate shape, each of the catalyst particles keeps generating carbon while forming a structure such as a tube with a diameter corresponding to the size of the catalyst particle. In this way, fibrous carbon nanostructures are synthesized and grown on the catalyst of the supported catalyst.

<<Carrier>>

The carrier is made of a given material, and has a particulate shape. The carrier is a portion forming a matrix structure for supporting the catalyst by, for example, attaching, fixing, depositing, or forming the catalyst on the carrier surface. Typically, when the carrier is particulate, the supported catalyst is particulate, too. This allows the supported catalyst to keep fluidizing while dispersing in the reaction site more uniformly in the fluidized bed process. Fibrous carbon nanostructures can thus be produced more efficiency.

The carrier being "particulate" means that the carrier has an approximately particulate shape, for example, the carrier has the above-mentioned aspect ratio. As used herein, the "aspect ratio of the carrier" can be obtained using a scanning electron microscope (SEM), without being particularly limited thereto. Specifically, for example, the aspect ratio of the carrier can be obtained by observing supported catalysts and, for any 50 supported catalysts, measuring the maximum diameter (major axis) and the particle diameter (minor axis) in the direction orthogonal to the maximum diameter and calculating the average value of the ratios of the major axis and the minor axis (major axis/minor axis).

The structure of the carrier may be composed of only the carrier, or an underlayer-equipped carrier having an optional underlayer for favorably supporting the catalyst on the surface of the carrier.

[Specific Surface Area]

The specific surface area of the carrier is preferably 1 $m^2/g$ or less, more preferably 0.3 $m^2/g$ or less, and further preferably 0.1 $m^2/g$ or less. Existing fibrous carbon nanostructure synthesis techniques using a fluidized bed process typically use a carrier made of porous metal oxide having a large specific surface area of 100 $m^2/g$ or more. The use of a carrier having a large specific surface area allows the catalyst to be supported on the carrier surface in large amount and increase the amount of fibrous carbon nanostructures produced. With the existing techniques, however, the contact area between the synthesized fibrous carbon nanostructures and the supported catalyst is large, and the fibrous carbon nanostructures and the supported catalyst are entwined complexly. This makes it difficult to separate the fibrous carbon nanostructures from the supported catalyst, so that the resultant fibrous carbon nanostructures have poor characteristics.

On the other hand, the carrier usable in the presently disclosed method of producing fibrous carbon nanostructures has a small specific surface area in the above-mentioned range, and has a smooth surface. Accordingly, the contact between the synthesized fibrous carbon nanostructures and the supported catalyst can be reduced. This eases the separation of the fibrous carbon nanostructures from the supported catalyst, and enables the obtainment of fibrous carbon nanostructures having excellent characteristics. Normally, if a carrier with a small surface area is used, the amount of the catalyst supported on the surface of the carrier decreases. With the presently disclosed method of producing fibrous carbon nanostructures, however, the double bond-containing hydrocarbon as carbon material can be supplied in high concentration by adding the carbon dioxide in high concentration, and therefore a sufficient reaction amount can be realized even in the case of using a supported catalyst with a relatively small catalyst supporting amount. In addition, even in the case of supplying the carbon material in high concentration, the carbonization deactivation of the catalyst can be prevented through the addition of 0.3 vol % or more of carbon dioxide. Consequently, even in the case where high concentration of carbon material is reacted at high ratio, the synthesis reaction of fibrous carbon nanostructures can be favorably maintained without exhaustion of carbon dioxide added in sufficiently high concentration.

[Volume-Average Particle Diameter]

The particle diameter of the carrier in volume-average particle diameter is preferably 1000 μm or less, more preferably 600 μm or less, and further preferably 400 μm or less, and is preferably 50 μm or more. If the volume-average particle diameter of the carrier is not more than the above-mentioned upper limit, the supported catalyst can fluidize favorably without sinking or staying downward in the reaction site. In particular, since the presently disclosed method of producing fibrous carbon nanostructures can lower the flow rate by reducing the concentration of carrier gas as mentioned above, even a supported catalyst of a relatively small size can keep fluidizing more stably without jumping out of the reaction tube. Consequently, fibrous carbon nanostructures can be produced more efficiently. Moreover, since a carrier of a small size is typically less costly than a carrier of a large size, the use of a carrier with a small particle diameter can further reduce the production cost of fibrous carbon nanostructures.

If the volume-average particle diameter of the carrier is not less than the above-mentioned lower limit, the fluidizing supported catalyst is prevented from jumping out of the reaction tube or staying upper part of the reaction tube, and so the supported catalyst can keep fluidizing easily and favorably.

[Type of Carrier]

The carrier preferably includes a metal oxide containing at least one element selected from the group consisting of magnesium (Mg), aluminum (Al), silicon (Si), zirconium (Zr), and molybdenum (Mo), without being particularly limited thereto. Any one of these elements may be contained alone or any two or more of these elements may be contained in combination. One or more elements other than those mentioned above may be further contained. For example, the carrier may contain any of the above-mentioned elements in a metal oxide state such as $SiO_2$, $Al_2O_3$, and MgO. The carrier may contain, in addition to the above-mentioned metal oxide, a nitride such as $Si_3N_4$ or AlN, a carbide such as SiC, etc.

The metal oxide, etc. contained in the carrier may be synthetic or naturally produced.

[Underlayer]

The underlayer that may be further included in the carrier is made of a given material, and, for example, can be formed in one or more layers on the surface of the carrier. In terms of favorably supporting the catalyst on the carrier to effectively use the supported catalyst, the carrier preferably has the underlayer on the carrier surface.

The composition of the underlayer is not particularly limited, and may be appropriately selected depending on the type of the carrier and the type of the below-mentioned catalyst. The film thickness of the underlayer formed may be appropriately adjusted depending on the desired amount of the catalyst supported.

<<Catalyst>>

The catalyst is supported on the surface of the particulate carrier described above. For example, the catalyst may be directly supported on the surface of the particulate carrier to form the supported catalyst, as a catalyst layer. Alternatively, the catalyst may be indirectly supported on the surface of the particulate carrier via the underlayer or the like to form the supported catalyst (multilayer structure having the carrier, the underlayer, and the catalyst in order from the inside), as a catalyst layer. The multilayer structure may, for example, optionally further include a plurality of underlayers and/or catalyst-containing layers.

The catalyst is typically present on the surface of the supported catalyst, and serves to facilitate the synthesis of fibrous carbon nanostructures.

[Type]

The composition of the catalyst is not particularly limited. For example, the composition of the catalyst contains metal such as iron (Fe), cobalt (Co), and nickel (Ni). Any one of these elements may be contained alone or any two or more of these elements may be contained in combination. In terms of synthesizing fibrous carbon nanostructures having a desired fine diameter, for example, the catalyst preferably contains fine metal particles including the above-mentioned metal.

[Volume-Average Particle Diameter]

The fine metal particles that may be contained in the catalyst preferably have a volume-average particle diameter of 1 nm or more and 30 nm or less. If the particle diameter of the fine metal particles is not less than the above-mentioned lower limit, the fine metal particles exhibit sufficient activity as a catalyst, so that fibrous carbon nanostructures such as carbon nanotubes can be produced further efficiently. If the particle diameter of the fine metal particles is not more than the above-mentioned upper limit, fibrous carbon nanostructures undergo nucleation efficiently owing to a small curvature radius, so that fibrous carbon nanostructures can be produced further efficiently. In addition, since fibrous carbon nanostructures typically form and grow with a diameter corresponding to the particle diameter of fine metal particles serving as a catalyst, the produced fibrous carbon nanostructures can be adjusted to the desired fine diameter.

[Supporting Method]

The catalyst supporting method is not particularly limited, and examples include a known dry method of deposition on the carrier surface by a sputtering method or a vapor deposition method such as a chemical vapor deposition method (CVD method). The carrier used when supporting the catalyst may be the carrier not subjected to surface treatment, deposition, and the like, or the carrier with the underlayer or the like formed on its outer surface.

<<Filling Rate of Supported Catalyst>>

The filling rate of the supported catalyst (catalyst filling rate) in the reaction site is preferably 1 vol % or more and 50 vol % or less, as the proportion of the true volume of the catalyst to the reactor volume. If the catalyst filling rate is 1 vol % or more, a sufficient amount of the supported catalyst can be supplied to the reaction site. If the catalyst filling rate is 50 vol % or less, a space for forming fibrous carbon nanostructures can be ensured.

<Fibrous Carbon Nanostructures>

The fibrous carbon nanostructures are not particularly limited, and are, for example, fibrous carbon nanostructures with an aspect ratio of more than 10. Examples of the fibrous carbon nanostructures include CNTs and vapor-grown carbon fibers.

As used herein, the "aspect ratio of the fibrous carbon nanostructures" can be obtained by measuring the diameters (external diameters) and lengths of 100 randomly selected fibrous carbon nanostructures using a transmission electron microscope.

Although the case where the fibrous carbon nanostructures obtained by the presently disclosed production method include CNTs is described below, the present disclosure is not limited to such.

<<Carbon Nanotubes>>

CNTs are a material that is formed by rolling up graphene sheets in cylindrical shape and has a one-dimensional structure with a very high aspect ratio (see NPL 1). The fibrous carbon nanostructures including CNTs may be composed only of CNTs, or may be a mixture of CNTs and fibrous carbon nanostructures other than CNTs.

The CNTs are not particularly limited, and may be single-walled carbon nanotubes and/or multi-walled carbon nanotubes. In terms of enhancing various characteristics such as mechanical strength, electrical characteristics, and thermal conductivity, the CNTs are preferably formed by at most ten layers, more preferably formed by at most five layers, and further preferably single-walled carbon nanotubes. The single-walled carbon nanotubes/multi-walled carbon nanotubes can be appropriately adjusted by, for example, changing various reaction conditions such as the catalyst size, the catalyst composition, the reaction time, and the source gas supply flow rate.

[Properties]

The average diameter of the fibrous carbon nanostructures including CNTs may be set to a desired value depending on use. For example, typically, the average diameter of CNTs or the like may be adjusted to about 1 nm in the case where the particle diameter of the fine metal particles in the catalyst is about 1 nm to 2 nm, and may be adjusted to about 20 nm to 30 nm in the case where the particle diameter of the fine metal particles is about 30 nm. In general, when the average diameter of CNTs is finer, various characteristics are improved. In particular, with the presently disclosed production method, the source gas contains the double bond-containing hydrocarbon and the predetermined content or more of carbon dioxide, so that the fibrous carbon nanostructures can be synthesized while suppressing the carbonization deactivation of the catalyst. Accordingly, even when the CNTs continue to undergo synthetic growth, the CNTs grow while favorably maintaining the size corresponding to the particle diameter of the fine metal particles.

The "average diameter" of the fibrous carbon nanostructures including CNTs can be obtained by, for example, measuring the diameters (external diameters) of 100 randomly selected fibrous carbon nanostructures using a transmission electron microscope.

The average length of the fibrous carbon nanostructures including CNTs may be set to a desired value depending on use. The average length at the time of synthesis is preferably 1 μm or more, and more preferably 50 μm or more. If the average length of the fibrous carbon nanostructures including CNTs at the time of synthesis is 1 μm or more, the resultant fibrous carbon nanostructures can exhibit various characteristics such as mechanical strength, electrical characteristics, and thermal conductivity more favorably. The longer the fibrous carbon nanostructures including CNTs at the time of synthesis, the more frequently the fibrous carbon nanostructures are broken or cut to be damaged. Thus, the average length of the fibrous carbon nanostructures including CNTs at the time of synthesis is preferably 5000 μm or less.

The "average length" of the fibrous carbon nanostructures including CNTs can be appropriately adjusted by, for example, changing the synthesis reaction time.

<Fluidized Bed Process>

The presently disclosed method of producing fibrous carbon nanostructures uses the fluidized bed process. Specifically, the source gas is caused to flow into the reaction site in which the supported catalyst keeps fluidizing, to efficiently produce fibrous carbon nanostructures.

<<Reaction Site>>

The reaction site is a space for synthesizing and growing fibrous carbon nanostructures, to which the catalyst such as the supported catalyst, the source gas containing the double bond-containing hydrocarbon and the carbon dioxide, other optional gas components, etc. can be supplied. An example of a device that provides the reaction site is a reaction tube 2 of a given size illustrated in FIG. 1. Typically, the reaction tube 2 is connected with a supply tube (not illustrated) for supplying source gas 12 and the like and an outlet tube (not illustrated) for discharging gas flow and the like.

The supported catalyst may be produced by supplying the carrier, the catalyst component, the underlayer component, etc. to the reaction site.

<<Reaction Temperature>>

The reaction temperature for synthesizing and growing fibrous carbon nanostructures is preferably 500° C. or more and more preferably 700° C. or more, and is preferably 1000° C. or less and more preferably 900° C. or less. If the reaction temperature is not less than the above-mentioned lower limit, the catalyst maintains sufficiently high activity, so that fibrous carbon nanostructures can be synthesized efficiently with higher yield. If the reaction temperature is not more than the above-mentioned upper limit, the double bond-containing hydrocarbon in the source gas is prevented from thermally decomposing and becoming soot, so that fibrous carbon nanostructures can be synthesized efficiently with higher yield.

The reaction temperature denotes the ambient temperature of the reaction site. In particular, since the presently disclosed method of producing fibrous carbon nanostructures can keep the total flow rate of the source gas flowing in the reaction site low, the ambient temperature of the reaction site can be maintained easily even in the case where the synthesis of fibrous carbon nanostructures is continued. The presently disclosed method of producing fibrous carbon nanostructures is therefore suitable for scale-up.

<<Reaction Time>>

The reaction time for synthesizing and growing fibrous carbon nanostructures is not particularly limited, and typically may be appropriately adjusted depending on the intended length of fibrous carbon nanostructures, the supply concentrations of the double bond-containing hydrocarbon and the carbon dioxide, the total flow rate of the source gas, the type and supply amount of the catalyst, the reaction temperature, and the like. For example, the reaction time may be 1 min or more and 100 min or less. In general, when the reaction time is longer, the resultant fibrous carbon nanostructures are longer. When the reaction time is shorter, the resultant fibrous carbon nanostructures are shorter. The reaction time may be adjusted by, for example, starting or stopping the flow of the source gas into the reaction site.

EXAMPLES

The following provides a more specific description of the present disclosure based on examples, although the present disclosure in not limited to the following examples.

The state observation of carbon nanotubes, the structure evaluation of carbon nanotubes, and the production yield of carbon nanotubes were performed or calculated as follows.

<State Observation of Carbon Nanotubes>

The surface state of carbon nanotubes synthesized on the catalyst of the supported catalyst was observed using a scanning electron microscope (SEM, Hitachi S-4800). The accelerating voltage was 5 kV, and the magnification was 100 times to 100,000 times. FIGS. 2A to 5D illustrate the obtained SEM images.

<Structure Evaluation of Carbon Nanotubes>

The structure of carbon nanotubes synthesized on the catalyst of the supported catalyst was measured and evaluated using a microscopic laser Raman spectrometer (Horiba HR-800). The excitation wavelength was 488 nm. FIGS. 6A to 9 illustrate the obtained Raman spectra.

<Production Yield Y of Carbon Nanotubes>

The weight $G_{c\text{-}source}$ (g) of carbon material contained in ethylene supplied to the reaction site was calculated using the total flow rate F (sccm) of the supplied source gas, the ethylene concentration $C_{C2H4}$ (vol %), the reaction time t (min), the molar volume V=22400 (cc/mol) of gas in standard state, and the molar mass M≈12 (g/mol) of carbon, according to the following equation (I):

$$G_{c\text{-}source}(g) = F \times (C_{C2H4}/100) \times t \times (1/V) \times (M \times 2) \quad \text{(I)}.$$

Following this, the yield amount $G_{CNT}$ (g) of carbon nanotubes synthesized on the catalyst of the supported catalyst was weighed using an electronic balance (produced by Shimadzu Corporation, model "AUW120D"). Here, $G_{CNT}$ was calculated by subtracting the mass of the supported catalyst from the total mass of the supported catalyst on which the carbon nanotubes were synthesized. The production yield Y was then calculated according to the following equation (II):

$$\text{production yield } Y (\%) \text{ of carbon nanotubes} = (G_{CNT}/G_{c\text{-}source}) \times 100 \quad \text{(II)}.$$

Figure 10:
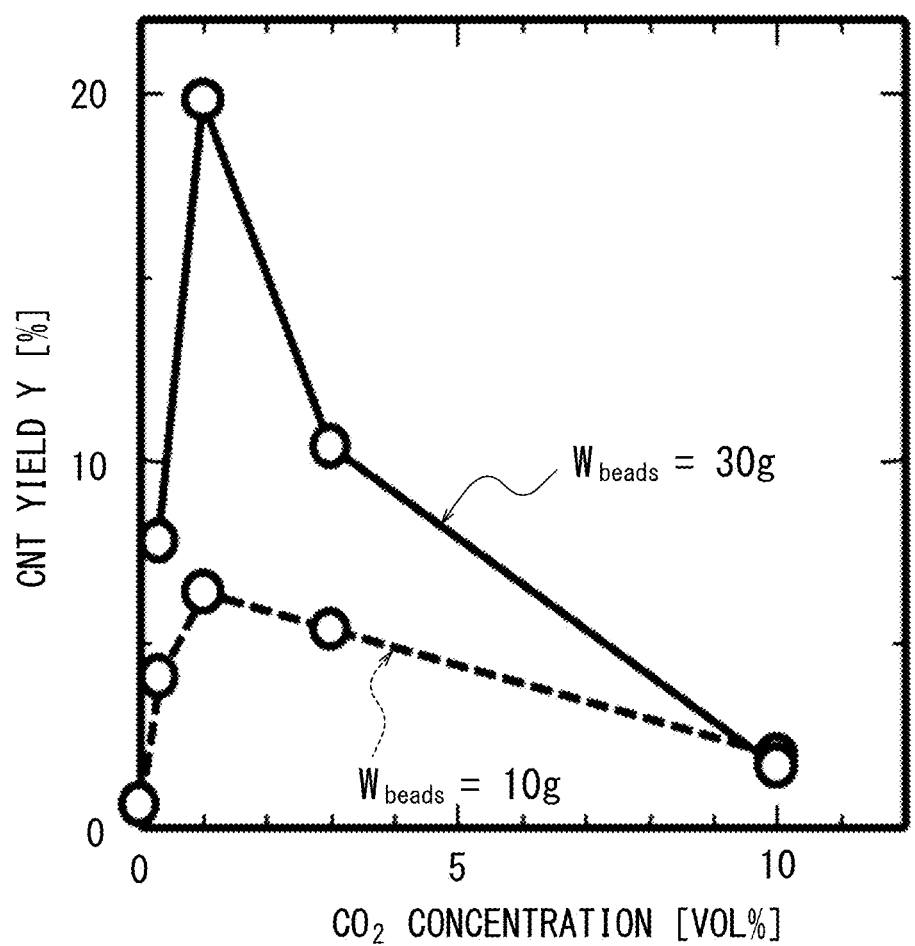
FIG. 10 is a graph illustrating the relationship between the concentration of carbon dioxide and the yield of carbon nanotubes according to Examples 1 to 4 and Comparative Example 1 (dotted line: supported catalyst supply amount $W_{beads}$=10 g) and Examples 5 to 8 (solid line: supported catalyst supply amount $W_{beads}$=30 g).

A higher value of the production yield Y indicates higher carbon nanotube production efficiency. Table 1 and FIG. 10 illustrate the results.

Example 1

<Production of Supported Catalyst>
<<Supporting of Catalyst>>

100 g of alumina beads ($Al_2O_3$, volume-average particle diameter D50: 300 μm) as a carrier were burned beforehand in a vertical tubular furnace in an environment of dry air flow and a temperature of 850° C., to remove impurities from the surface. An aluminum layer (average film thickness: 15 nm) was then deposited on the burned alumina beads by sputtering, and released to the atmosphere to undergo natural oxidation, thus obtaining an aluminum oxide ($Al_2O_3$) underlayer. Further, an iron catalyst layer (Fe catalyst layer, average film thickness: 1 nm) was deposited on the $Al_2O_3$ underlayer by sputtering, to obtain a supported catalyst before activation.

In this example, the catalyst was supported by drum sputtering, and accordingly the $Al_2O_3$ underlayer and the Fe catalyst layer were formed approximately uniformly on the whole spherical surfaces of the alumina beads.

<<Activation of Catalyst>>

10 g of the resultant supported catalyst before activation was supplied into a reaction tube 2 (internal diameter: 2.2 cm, reaction site height: 15 cm) equipped with a dispersion plate 4 illustrated in FIG. 1, and heated to a temperature of 850° C. using a heater 6. After this, activation gas 10 composed of 10 vol % of hydrogen ($H_2$) and 90 vol % of nitrogen gas ($N_2$) was supplied at a flow rate of 1500 sccm for 5 min. Thus, the supported Fe catalyst layer was reduced to activate the catalyst, to obtain a supported catalyst 8.

<Synthesis of Carbon Nanotubes>

For the resultant supported catalyst, source gas 12 composed of 0.3 vol % of carbon dioxide gas ($CO_2$), 20.0 vol % of ethylene gas ($C_2H_4$), 10 vol % of hydrogen gas ($H_2$), and other nitrogen gas ($N_2$) was supplied into the reaction tube 2 at a total flow rate of 1500 sccm for 10 min in an environment of normal pressure and a temperature of 850° C. By supplying the source gas in this way, carbon nanotubes were synthesized on the supported catalyst by the fluidized bed process of causing the supported catalyst to fluidize.

The supported catalyst having the carbon nanotubes synthesized thereon was used to perform the state observation of carbon nanotubes, the structure evaluation of carbon nanotubes, and the calculation of the production yield of carbon nanotubes by the above-mentioned methods. Table 1 and FIGS. 2B, 6A, 6B, and 10 illustrate the results.

Example 2

A supported catalyst before activation, a supported catalyst, and a supported catalyst with carbon nanotubes synthesized thereon were obtained in the same way as Example 1, except that the concentration of $CO_2$ was changed to 1.0 vol % in the carbon nanotube synthesis.

The calculation and observation were then performed by the same methods as in Example 1. Table 1 and FIGS. 2C, 6A, 6B, and 10 illustrate the results.

Example 3

A supported catalyst before activation, a supported catalyst, and a supported catalyst with carbon nanotubes synthesized thereon were obtained in the same way as Example 1, except that the concentration of $CO_2$ was changed to 3.0 vol % in the carbon nanotube synthesis.

The calculation and observation were then performed by the same methods as in Example 1. Table 1 and FIGS. 2D, 6A, 6B, and 10 illustrate the results.

Example 4

A supported catalyst before activation, a supported catalyst, and a supported catalyst with carbon nanotubes synthesized thereon were obtained in the same way as Example 1, except that the concentration of $CO_2$ was changed to 10.0 vol % in the carbon nanotube synthesis.

The calculation and observation were then performed by the same methods as in Example 1. Table 1 and FIGS. 2E, 6A, 6B, and 10 illustrate the results.

Example 5

A supported catalyst before activation, a supported catalyst, and a supported catalyst with carbon nanotubes synthesized thereon were obtained in the same way as Example 1, except that the supply amount of the supported catalyst to the reaction tube was changed to 30 g in the catalyst activation and used for the carbon nanotube synthesis.

The calculation and observation were then performed by the same methods as in Example 1. Table 1 and FIG. 10 illustrate the results.

Example 6

A supported catalyst before activation, a supported catalyst, and a supported catalyst with carbon nanotubes synthesized thereon were obtained in the same way as Example 1, except that the supply amount of the supported catalyst to the reaction tube was changed to 30 g in the catalyst activation and used for the carbon nanotube synthesis, and the concentration of $CO_2$ was changed to 1.0 vol % in the carbon nanotube synthesis.

The calculation and observation were then performed by the same methods as in Example 1. Table 1 and FIGS. 3, 7A, 7B, and 10 illustrate the results.

Example 7

A supported catalyst before activation, a supported catalyst, and a supported catalyst with carbon nanotubes synthesized thereon were obtained in the same way as Example 1, except that the supply amount of the supported catalyst to the reaction tube was changed to 30 g in the catalyst activation and used for the carbon nanotube synthesis, and the concentration of $CO_2$ was changed to 3.0 vol % in the carbon nanotube synthesis.

The calculation and observation were then performed by the same methods as in Example 1. Table 1 and FIG. 10 illustrate the results.

Example 8

A supported catalyst before activation, a supported catalyst, and a supported catalyst with carbon nanotubes synthesized thereon were obtained in the same way as Example 1, except that the supply amount of the supported catalyst to the reaction tube was changed to 30 g in the catalyst activation and used for the carbon nanotube synthesis, and the concentration of $CO_2$ was changed to 10.0 vol % in the carbon nanotube synthesis.

The calculation and observation were then performed by the same methods as in Example 1. Table 1 and FIG. 10 illustrate the results.

Example 9

A supported catalyst before activation, a supported catalyst, and a supported catalyst with carbon nanotubes synthesized thereon were obtained in the same way as Example 1, except that, in the carbon nanotube synthesis, the concentration of $CO_2$ was changed to 3.0 vol %, the concentration of $C_2H_4$ was changed to 10.0 vol %, the reaction temperature was changed to 800° C., and the total flow rate was changed to 850 sccm.

Figure 4A:
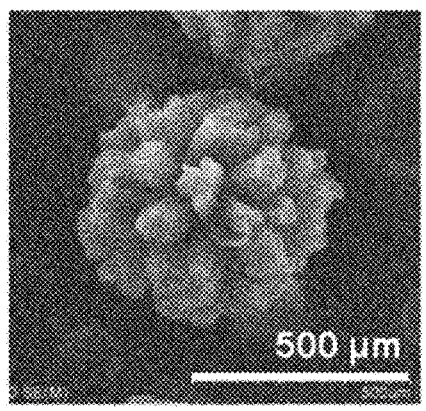
FIG. 4A is a scanning electron microscope (SEM) image of carbon nanotubes synthesized on a supported catalyst according to Example 9.
Figure 4A:
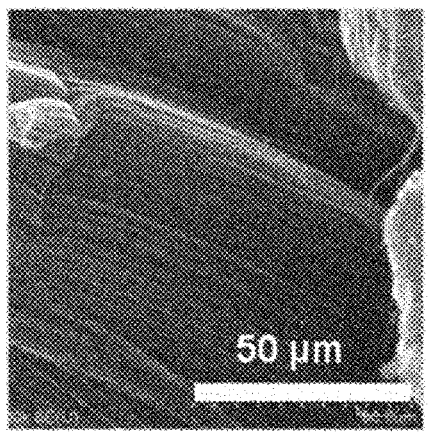
Figure 4A:
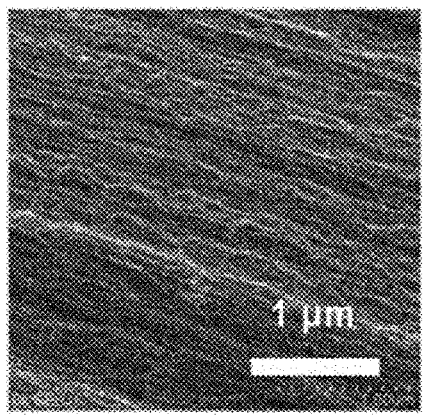
Figure 8A:
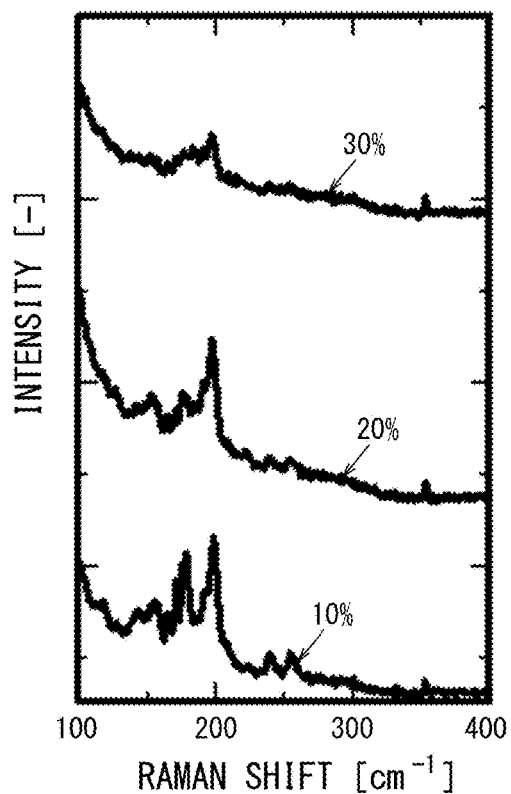
FIGS. 8A-8B are Raman spectral plots ((A) radial breathing mode peak, (B) G, D band) according to Examples 9 to 11.
Figure 8B:
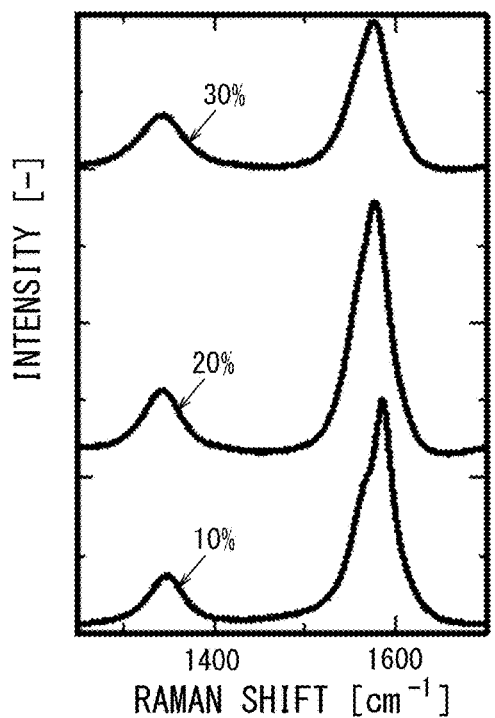

The calculation and observation were then performed by the same methods as in Example 1. Table 1 and FIGS. 4A, 8A and 8B illustrate the results.

Example 10

A supported catalyst before activation, a supported catalyst, and a supported catalyst with carbon nanotubes synthesized thereon were obtained in the same way as Example 1, except that, in the carbon nanotube synthesis, the concentration of $CO_2$ was changed to 3.0 vol %, the reaction temperature was changed to 800° C., and the total flow rate was changed to 850 sccm.

Figure 4B:
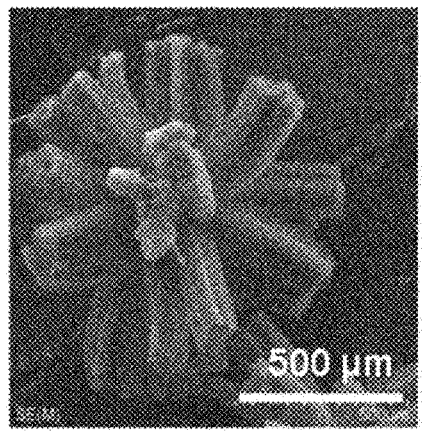
FIG. 4B is a scanning electron microscope (SEM) image of carbon nanotubes synthesized on a supported catalyst according to Example 10.
Figure 4B:
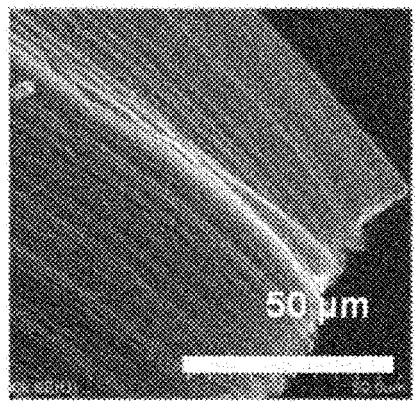
Figure 4B:
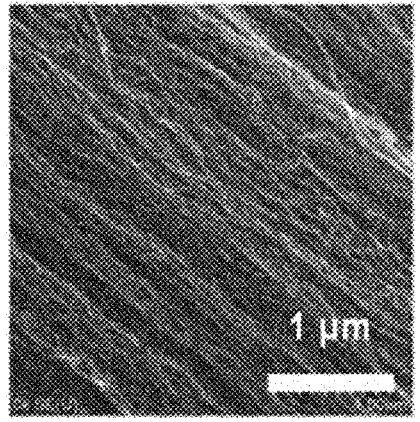

The calculation and observation were then performed by the same methods as in Example 1. Table 1 and FIGS. 4B, 8A and 8B illustrate the results.

Example 11

A supported catalyst before activation, a supported catalyst, and a supported catalyst with carbon nanotubes synthesized thereon were obtained in the same way as Example 1, except that, in the carbon nanotube synthesis, the concentration of $CO_2$ was changed to 3.0 vol %, the concentration of $C_2H_4$ was changed to 30.0 vol %, the reaction temperature was changed to 800° C., and the total flow rate was changed to 850 sccm.

Figure 4C:
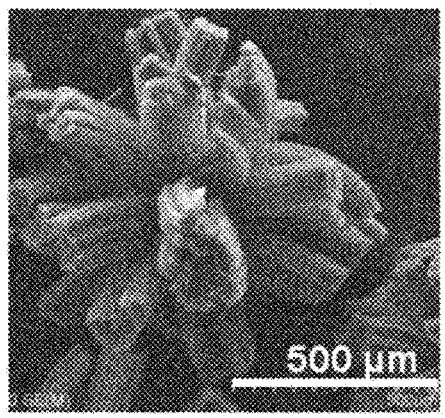
FIG. 4C is a scanning electron microscope (SEM) image of carbon nanotubes synthesized on a supported catalyst according to Example 11.
Figure 4C:
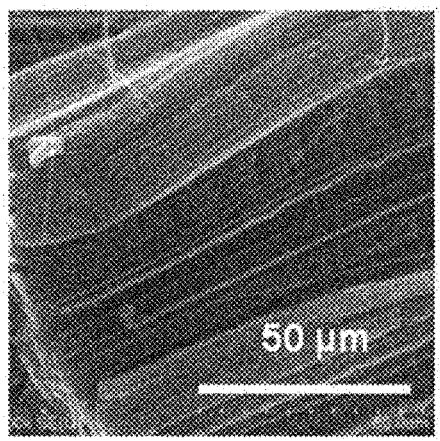
Figure 4C:
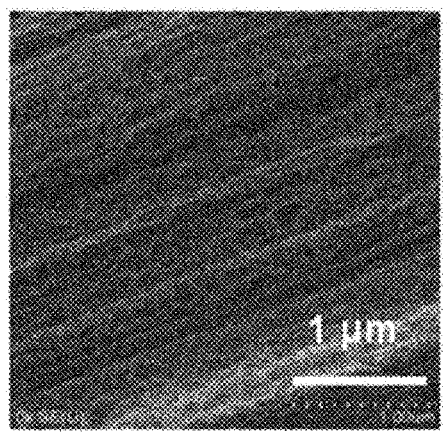

The calculation and observation were then performed by the same methods as in Example 1. Table 1 and FIG. 4C and 8 illustrate the results.

Example 12

A supported catalyst before activation, a supported catalyst, and a supported catalyst with carbon nanotubes synthesized thereon were obtained in the same way as Example 1, except that, in the supported catalyst production, a supported catalyst was produced in the following manner and used, and in the carbon nanotube synthesis, the concentration of $CO_2$ was changed to 3.0 vol %, the concentration of $C_2H_4$ was changed to 10.0 vol %, the position of the dispersion plate 4 was lowered by 12 cm to set the reaction site height to 27 cm, and the reaction temperature was changed to 725° C.

The calculation and observation were then performed by the same methods as in Example 1. Table 1 and FIG. 5A illustrate the results.

<Production of Supported Catalyst>
[Supporting of Catalyst]
[[Preparation]]

A mullite powder (produced by Itochu Ceratech Corporation, "NAIGAI CERABEADS 60", #750) with a volume-average particle diameter (D50) of about 150 μm was used as a carrier. A reaction tube formed by a glass tube was filled with 70 g of the mullite powder, heated to a temperature of 800° C. at a rate of 40° C./min in an atmosphere of 4 vol % of oxygen and 96 vol % of nitrogen, and held for 2 min. Mullite used in this example is a type of aluminosilicate expressed by the general formula $xM_2O \cdot yAl_2O_3 \cdot zSiO_2 \cdot nH_2O$ [where M denotes a metal atom and x to z and n denote the molar numbers (0 or more) of the respective components].

[[Underlayer Formation]]

Next, vapors of aluminum isopropoxide (produced by Wako Pure Chemical Industries, Ltd., trade name "012-16012", chemical formula: $Al(O-i-Pr)_3$ [i-Pr is isopropyl group-$CH(CH_3)_2$]) as an underlayer component were accompanied by $N_2$ gas with a flow rate of 500 sccm, and supplied for 5 min together with gas of 4 vol % of oxygen and 96 vol % of nitrogen, supplied at 10 slm, to form an aluminum oxide ($Al_2O_3$) layer (average film thickness: 5 nm) as an underlayer on the mullite powder as a carrier by a chemical vapor deposition method.

[[Catalyst Layer Formation]]

Next, vapors of ferrocene (produced by Wako Pure Chemical Industries, Ltd., trade name "060-05981") as a catalyst component were accompanied by $N_2$ gas with a flow rate of 20 sccm, and supplied for 5 min together with gas of 4 vol % of oxygen and 96 vol % of nitrogen, supplied at 10 slm, to form a Fe catalyst layer (average film thickness: 0.5 nm) containing fine metal particles made of iron by a chemical vapor deposition method.

[[Repetition]]

For the supported catalyst in which the underlayer and the catalyst layer had been formed, the above-mentioned underlayer formation and catalyst layer formation were further repeated four times, thus producing a supported catalyst before activation including five underlayers and five catalyst layers.

[Activation of Catalyst]

A reaction tube for carbon nanotube synthesis formed by a glass tube (internal diameter: 22 mm) was filled with the resultant supported catalyst before activation to a layer height of 6 cm (equivalent to a supported catalyst supply amount of 54 g). Subsequently, the inside of the fluidized bed device for CNT synthesis was heated to 800° C. in an atmosphere containing 10 vol % of hydrogen and 90 vol % of nitrogen, and held for 10 min to reduce the Fe catalyst layer and activate the catalyst, thus obtaining a supported catalyst.

Example 13

A supported catalyst before activation, a supported catalyst, and a supported catalyst with carbon nanotubes synthesized thereon were obtained in the same way as Example 12, except that the filling amount of the supported catalyst before activation was changed to a layer height of 3 cm (equivalent to a supported catalyst supply amount of 27 g) in the catalyst activation and used for the carbon nanotube synthesis, and the reaction temperature was changed to 800° C. in the carbon nanotube synthesis.

Figure 5B:
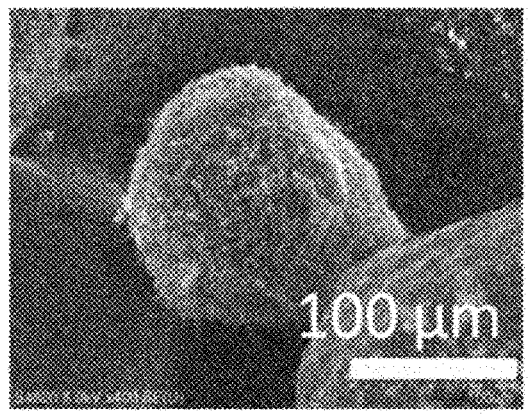
FIG. 5B is a scanning electron microscope (SEM) image of carbon nanotubes synthesized on a supported catalyst according to Example 13.
Figure 5B:
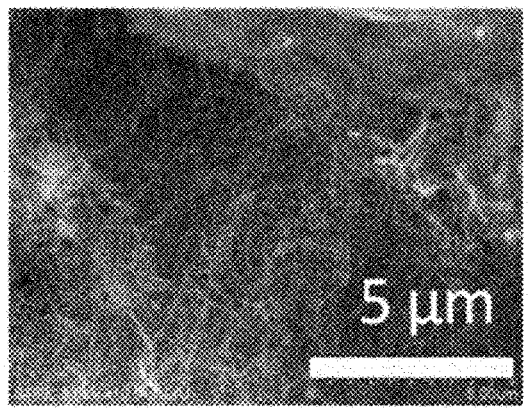
Figure 9:
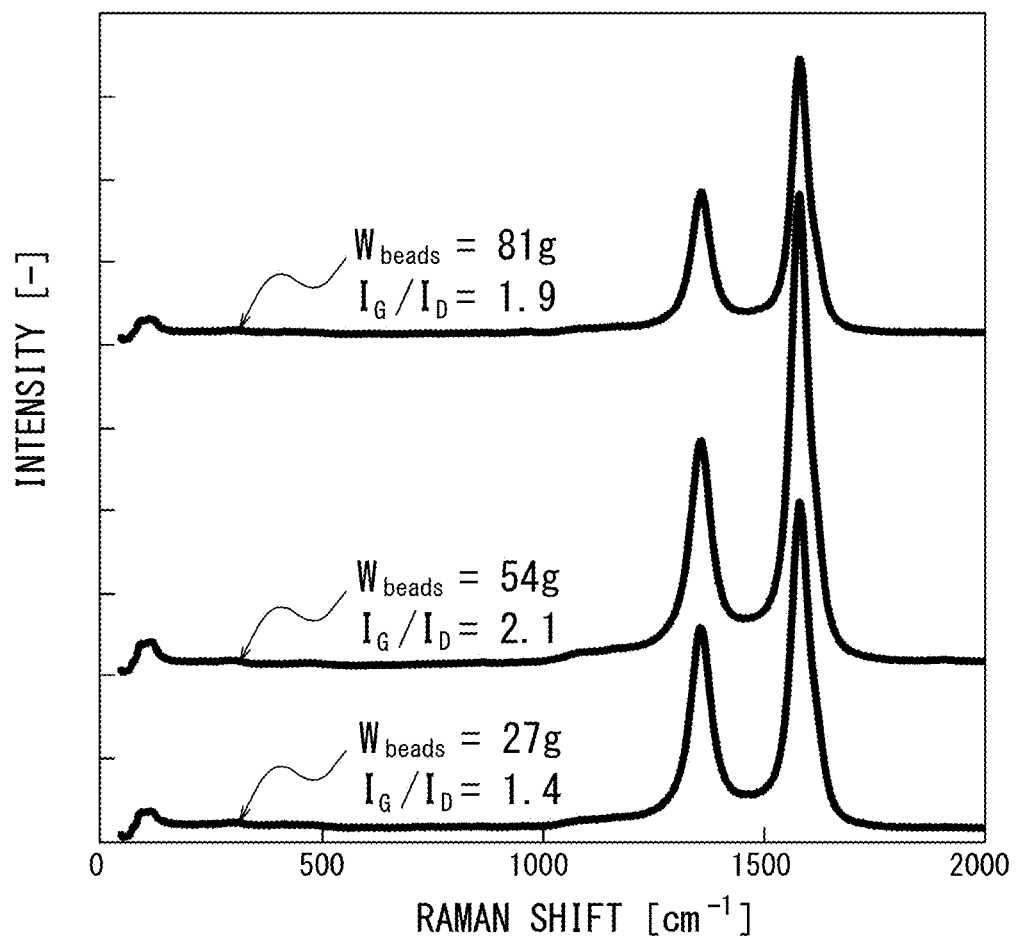
FIG. 9 is a Raman spectral plot (G, D band) according to Examples 13 to 15.

The calculation and observation were then performed by the same methods as in Example 1. Table 1 and FIGS. 5B and 9 illustrate the results.

Example 14

A supported catalyst before activation, a supported catalyst, and a supported catalyst with carbon nanotubes synthesized thereon were obtained in the same way as Example 12, except that the reaction temperature was changed to 800° C. in the carbon nanotube synthesis.

Figure 5C:
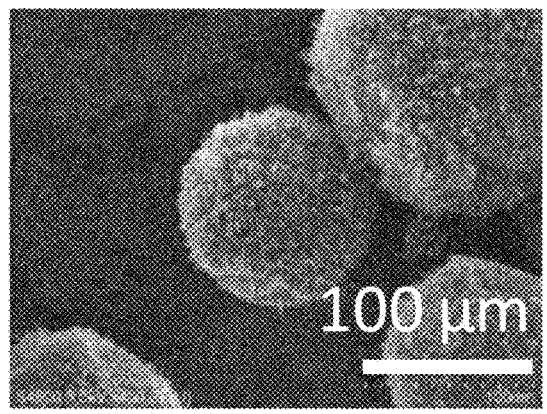
FIG. 5C is a scanning electron microscope (SEM) image of carbon nanotubes synthesized on a supported catalyst according to Example 14.
Figure 5C:
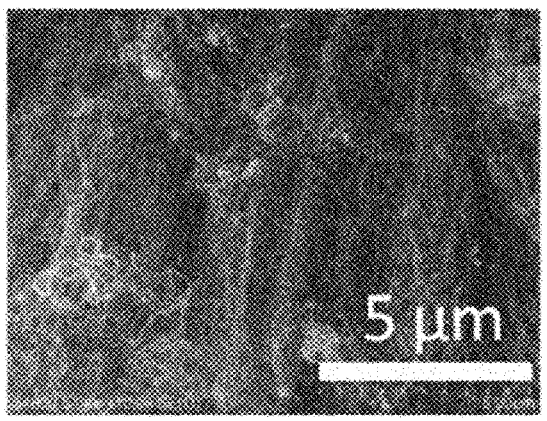

The calculation and observation were then performed by the same methods as in Example 1. Table 1 and FIGS. 5C and 9 illustrate the results.

Example 15

A supported catalyst before activation, a supported catalyst, and a supported catalyst with carbon nanotubes synthesized thereon were obtained in the same way as Example 12, except that the filling amount of the supported catalyst before activation was changed to a layer height of 9 cm (equivalent to a supported catalyst supply amount of 81 g) in the catalyst activation and used for the carbon nanotube synthesis, and the reaction temperature was changed to 800° C. in the carbon nanotube synthesis.

Figure 5D:
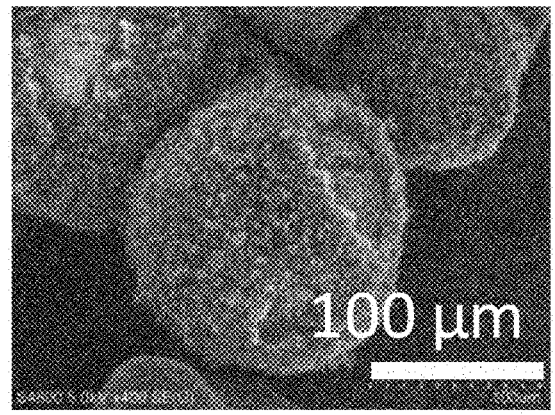
FIG. 5D is a scanning electron microscope (SEM) image of carbon nanotubes synthesized on a supported catalyst according to Example 15.
Figure 5D:
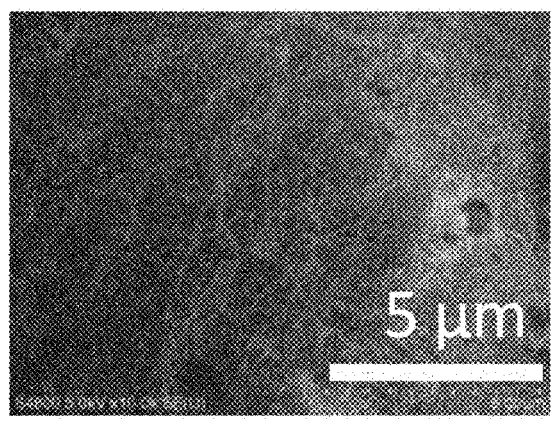
Figure 6A:
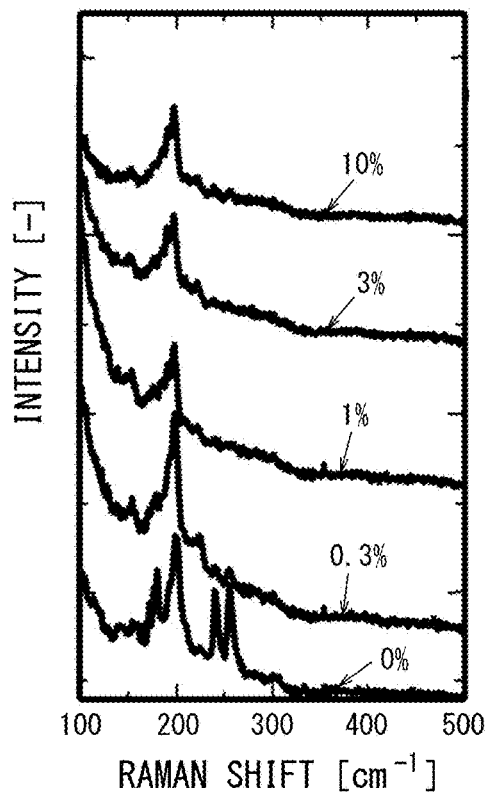
FIGS. 6A-6B are Raman spectral plots ((A) radial breathing mode peak, (B) G, D band) according to Examples 1 to 4 and Comparative Example 1.
Figure 6B:
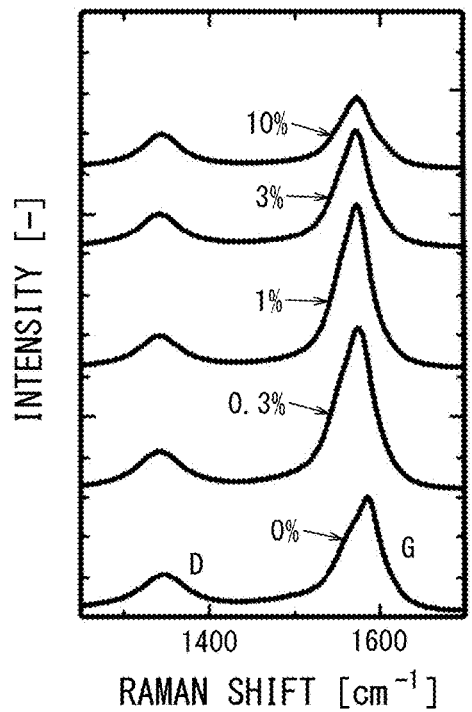
Figure 7A:
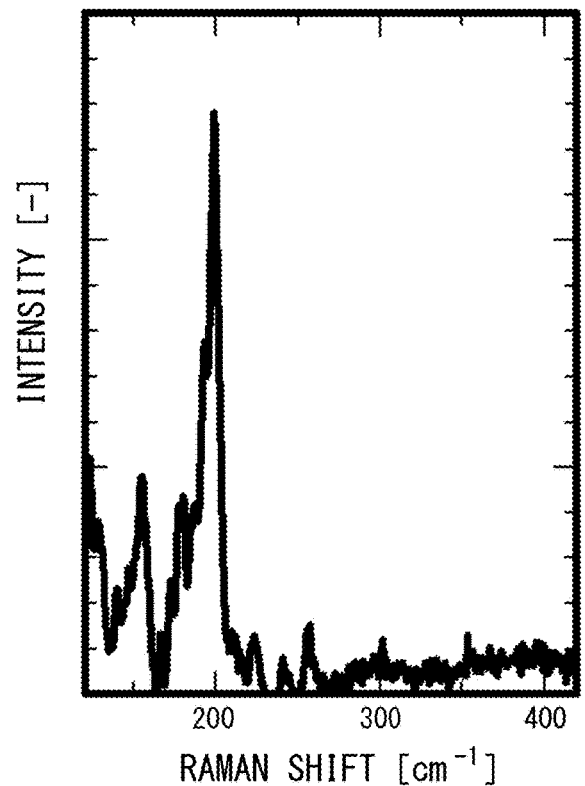
FIGS. 7A-7B are Raman spectral plots ((A) radial breathing mode peak, (B) G, D band) according to Example 6.
Figure 7B:
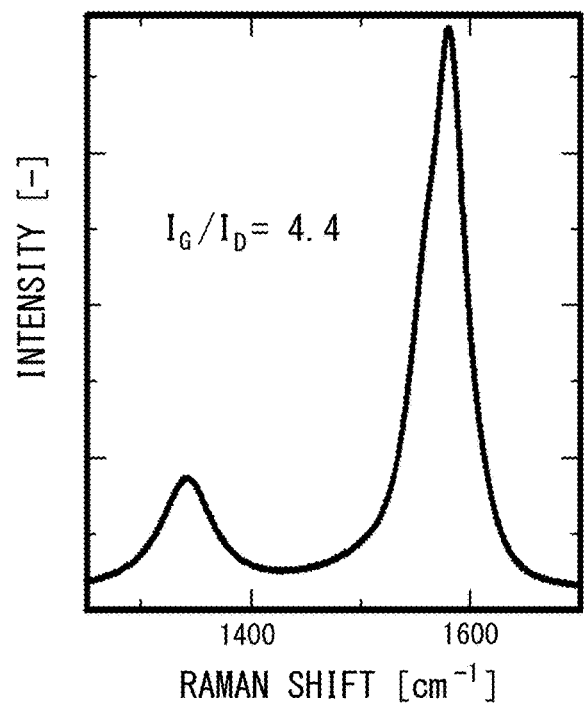

The calculation and observation were then performed by the same methods as in Example 1. Table 1 and FIGS. 5D and 9 illustrate the results.

Comparative Example 1

A supported catalyst before activation, a supported catalyst, and a supported catalyst with carbon nanotubes synthesized thereon were obtained in the same way as Example 1, except that $CO_2$ was not added (the concentration of $CO_2$ was changed to 0 vol %) in the carbon nanotube synthesis.

The calculation and observation were then performed by the same methods as in Example 1. Table 1 and FIGS. 2A, 6A, 6B, and 10 illustrate the results.

TABLE 1

| | | | Examples | | | | | | | |
|---|---|---|---|---|---|---|---|---|---|---|
| | | | 1 | 2 | 3 | 4 | 5 | 6 | 7 | 8 |
| Source gas | Carbon dioxide concentration $C_{CO2}$ [vol %] | | 0.3 | 1.0 | 3.0 | 10.0 | 0.3 | 1.0 | 3.0 | 10.0 |
| | Double bond-containing hydrocarbon (carbon material) | Ethylene concentration $C_{C2H4}$ [vol %] | 20.0 | 20.0 | 20.0 | 20.0 | 20.0 | 20.0 | 20.0 | 20.0 |
| | Carrier gas | Hydrogen concentration $C_{H2}$ [vol %] | 10.0 | 10.0 | 10.0 | 10.0 | 10.0 | 10.0 | 10.0 | 10.0 |
| | | Nitrogen concentration $C_{N2}$ [vol %] | 69.7 | 69.0 | 67.0 | 60.0 | 69.7 | 69.0 | 67.0 | 60.0 |
| | Carrier gas/ethylene [times] | | 4.0 | 4.0 | 3.9 | 3.5 | 4.0 | 4.0 | 3.9 | 3.5 |
| | Total flow rate F [sccm] | | 1500 | 1500 | 1500 | 1500 | 1500 | 1500 | 1500 | 1500 |
| Supported catalyst | Structure | | \multicolumn{8}{c}{$Fe/Al_2O_3/Al_2O_3$ carrier *underlayer and catalyst layer formed by sputtering} |
| | Volume-average particle diameter D50 of carrier [μm] | | 300 | 300 | 300 | 300 | 300 | 300 | 300 | 300 |
| | Supported catalyst supply amount $W_{beads}$ [g] | | 10 | 10 | 10 | 10 | 30 | 30 | 30 | 30 |
| | Catalyst filling rate [vol %] | | 4.5 | 4.5 | 4.5 | 4.5 | 13.5 | 13.5 | 13.5 | 13.5 |
| Reaction condition | Reaction temperature T [° C.] | | 850 | 850 | 850 | 850 | 850 | 850 | 850 | 850 |
| | Reaction time t [min] | | 10 | 10 | 10 | 10 | 10 | 10 | 10 | 10 |
| Production efficiency | CNT yield amount $G_{CNT}$ [mg] | | 131.7 | 205.7 | 173.6 | 64.3 | 250.7 | 636.4 | 334.3 | 53.7 |
| | CNT yield Y [%] | | 4.1 | 6.4 | 5.4 | 2.0 | 7.8 | 19.8 | 10.4 | 1.7 |

| | | | Examples | | | | | | | Comparative Example |
|---|---|---|---|---|---|---|---|---|---|---|
| | | | 9 | 10 | 11 | 12 | 13 | 14 | 15 | 1 |
| Source gas | Carbon dioxide concentration $C_{CO2}$ [vol %] | | 3.0 | 3.0 | 3.0 | 3.0 | 3.0 | 3.0 | 3.0 | 0.0 |
| | Double bond-containing hydrocarbon (carbon material) | Ethylene concentration $C_{C2H4}$ [vol %] | 10.0 | 20.0 | 30.0 | 10.0 | 10.0 | 10.0 | 10.0 | 20.0 |
| | Carrier gas | Hydrogen concentration $C_{H2}$ [vol %] | 10.0 | 10.0 | 10.0 | 10.0 | 10.0 | 10.0 | 10.0 | 10.0 |
| | | Nitrogen concentration $C_{N2}$ [vol %] | 77.0 | 67.0 | 57.0 | 77.0 | 77.0 | 77.0 | 77.0 | 70.0 |
| | Carrier gas/ethylene [times] | | 8.7 | 3.9 | 2.2 | 8.7 | 8.7 | 8.7 | 8.7 | 4.0 |
| | Total flow rate F [sccm] | | 850 | 850 | 850 | 1500 | 1500 | 1500 | 1500 | 1500 |
| Supported catalyst | Structure | | $Fe/Al_2O_3/Al_2O_3$ carrier *underlayer and catalyst layer formed by sputtering | | | $Fe/Al_2O_3/(Fe/Al_2O_3)_4$/mullite carrier *underlayer and catalyst layer formed by vapor deposition | | | | Same as Example 1 |
| | Volume-average particle diameter D50 of carrier [μm] | | 300 | 300 | 300 | 150 | 150 | 150 | 150 | 300 |
| | Supported catalyst supply amount $W_{beads}$ [g] | | 10 | 10 | 10 | 54 | 27 | 54 | 81 | 10 |
| | Catalyst filling rate [vol %] | | 4.5 | 4.5 | 4.5 | 18.8 | 9.4 | 18.8 | 28.2 | 4.5 |

TABLE 1-continued

| | | | | | | | | | |
|---|---|---|---|---|---|---|---|---|---|
| Reaction condition | Reaction temperature T [° C.] | 800 | 800 | 800 | 725 | 800 | 800 | 800 | 850 |
| | Reaction time t [min] | 10 | 10 | 10 | 10 | 10 | 10 | 10 | 10 |
| Production efficiency | CNT yield amount $G_{CNT}$ [mg] | 85.2 | 218.0 | 129.0 | 80.0 | 100.0 | 170.0 | 410.0 | 20.5 |
| | CNT yield Y [%] | 9.4 | 11.9 | 4.7 | 5.0 | 6.3 | 10.6 | 25.6 | 0.6 |

Table 1 demonstrates that carbon nanotubes were synthesized very efficiently (with high yield) in Examples 1 to 15 in which 0.3 vol % or more of carbon dioxide was added to source gas, as compared with Comparative Example 1 in which carbon dioxide was not added to source gas.

Moreover, as can be seen from FIGS. 2A to 10, single-walled carbon nanotubes fine in diameter were favorably synthesized and grown on the supported catalyst in Examples 1 to 15.

INDUSTRIAL APPLICABILITY

It is therefore possible to provide a method of producing fibrous carbon nanostructures that is capable of highly efficient synthesis and growth of fibrous carbon nanostructures such as carbon nanotubes at lower cost.

REFERENCE SIGNS LIST 2 reaction tube
4 dispersion plate
6 heater
8 supported catalyst
10 activation gas
12 source gas

The invention claimed is:

1. A method of producing fibrous carbon nanostructures using a fluidized bed process, the method comprising
supplying a source gas to a reaction site in which a supported catalyst having a particulate carrier and a catalyst supported on a surface of the carrier is fluidizing, to form fibrous carbon nanostructures on the catalyst of the supported catalyst,
wherein the source gas contains a double bond-containing hydrocarbon and carbon dioxide,
a content of the carbon dioxide is 0.3 vol % or more with respect to a total volume of the source gas,
a specific surface area of the carrier is 1 m²/g or less, and
the carrier includes metal oxide selected from a group consisting of silicon oxide, zirconium oxide, molybdenum oxide, and composite oxide containing at least two elements of aluminum, silicon, zirconium, and molybdenum.

2. The method of producing fibrous carbon nanostructures according to claim 1,
wherein a content of the double bond-containing hydrocarbon is 4 vol % or more with respect to the total volume of the source gas.

3. The method of producing fibrous carbon nanostructures according to claim 1,
wherein the source gas further contains a carrier gas, and a volumetric content of the carrier gas is not more than 10 times a volumetric content of the double bond-containing hydrocarbon.

4. The method of producing fibrous carbon nanostructures according to claim 1,
wherein the double bond-containing hydrocarbon is ethylene.

5. The method of producing fibrous carbon nanostructures according to claim 3, wherein the carrier gas contains hydrogen gas.

6. The method of producing fibrous carbon nanostructures according to claim 1, wherein the fibrous carbon nanostructures include single-walled carbon nanotubes.

7. The method of producing fibrous carbon nanostructures according to claim 1, wherein the particulate carrier has a spherical surface.

* * * * *